US 7,080,049 B2

(12) United States Patent
Truitt et al.

(10) Patent No.: US 7,080,049 B2
(45) Date of Patent: Jul. 18, 2006

(54) METHOD AND SYSTEM FOR PROCESSING A TRANSACTION

(75) Inventors: Jennifer R. Truitt, Campbell, CA (US); M. Brendan Philbin, San Jose, CA (US); Joseph M. Lynam, Cupertino, CA (US); Ken R. Dawson, Pleasanton, CA (US)

(73) Assignee: PaymentOne Corporation, San Jose, CA (US)

( * ) Notice: Subject to any disclaimer, the term of this patent is extended or adjusted under 35 U.S.C. 154(b) by 743 days.

(21) Appl. No.: 09/962,043

(22) Filed: Sep. 21, 2001

(65) Prior Publication Data

US 2003/0200182 A1 Oct. 23, 2003

(51) Int. Cl.
*G06F 153/00* (2006.01)

(52) U.S. Cl. .......................... 705/75; 705/26; 705/50; 705/64; 705/75; 713/185; 713/186; 380/30; 380/46

(58) Field of Classification Search ............. 705/26, 705/64, 50, 75; 379/112, 114
See application file for complete search history.

(56) References Cited

U.S. PATENT DOCUMENTS

| | | | | |
|---|---|---|---|---|
| 5,247,575 A | * | 9/1993 | Sprague et al. | ............... 705/53 |
| 5,313,463 A | | 5/1994 | Gore et al. | |
| 5,319,542 A | * | 6/1994 | King et al. | ................... 705/27 |
| 5,329,589 A | | 7/1994 | Fraser et al. | |
| 5,524,142 A | | 6/1996 | Lewis et al. | |
| 5,537,464 A | * | 7/1996 | Lewis et al. | ............ 379/114.25 |
| 5,544,229 A | | 8/1996 | Creswell et al. | |
| 5,633,919 A | | 5/1997 | Hogan et al. | |
| 5,655,007 A | | 8/1997 | McAllister | |

(Continued)

FOREIGN PATENT DOCUMENTS

GB 2223652 A * 4/1990

OTHER PUBLICATIONS

Electronic Data Interchange–VANs Rise To The Internet Challenge–Bank Technology News, p.: N/A, Nov. 1, 1996.*
International Search Report–PCT/US02/30077–Jan. 2, 2003.
Rob Kling, "4.1.2, Consumer Convenience and Protection", Software patent Institute Database of Software Technologies, 1978, pp. 1–3, USA, web page http://m.spi.org/cgi-bin/newqry?ISA...ec=4&submit=seeit&csum= 110184817619.

* cited by examiner

*Primary Examiner*—James P. Trammell
*Assistant Examiner*—Daniel L. Greene
(74) *Attorney, Agent, or Firm*—Schwegman, Lundberg, Woessner & Kluth, P.A.

(57) ABSTRACT

A method of, and system for, processing payment for a transaction is provided. The method includes providing a user with an option to select payment for the transaction from an account associated with a communication line via which an electronic terminal is connected to a communication network. The communication line is typically a subscriber line and, accordingly, the account is a telephone account associated with the subscriber line. When a user transacts with a vendor for goods and/or services, the user may request to process payment using the telephone account instead of using a credit or debit card. The method includes investigating data using the telephone number associated with the subscriber line and, selectively approving the transaction dependent upon an outcome of the investigation. The invention extends to a transaction processor interface and to and a transaction validation module. The invention also extends to computer program products including the invention.

27 Claims, 12 Drawing Sheets

U.S. PATENT DOCUMENTS

| | | |
|---|---|---|
| 5,740,427 A | 4/1998 | Stoller |
| 5,748,890 A | 5/1998 | Goldberg et al. |
| 5,845,267 A | 12/1998 | Ronen |
| 5,867,494 A | 2/1999 | Krishnaswamy et al. |
| 5,867,566 A | 2/1999 | Hogan et al. |
| 5,898,765 A | 4/1999 | Teglovic et al. |
| 5,956,391 A | 9/1999 | Melen et al. |
| 5,963,625 A | 10/1999 | Kawecki et al. |
| 5,978,775 A * | 11/1999 | Chen .......................... 705/26 |
| 6,023,499 A | 2/2000 | Mansey et al. |
| 6,023,502 A * | 2/2000 | Bouanaka et al. ..... 379/114.01 |
| 6,055,513 A | 4/2000 | Katz et al. |
| 6,094,644 A | 7/2000 | Hillson et al. |
| 6,104,798 A | 8/2000 | Lockiss et al. |
| 6,137,869 A | 10/2000 | Voit et al. |
| 6,163,602 A | 12/2000 | Hammond et al. |
| 6,195,697 B1 | 2/2001 | Bowman-Amuah |
| 6,208,720 B1 | 3/2001 | Curtis et al. |
| 6,212,262 B1 | 4/2001 | Kamel |
| 6,233,313 B1 | 5/2001 | Farris et al. |
| 6,247,047 B1 | 6/2001 | Wolff |
| 6,260,024 B1 | 7/2001 | Shkedy |
| 6,272,152 B1 | 8/2001 | Levin et al. |
| 6,282,276 B1 | 8/2001 | Felger |
| 6,289,010 B1 | 9/2001 | Voit et al. |
| 6,295,292 B1 | 9/2001 | Voit et al. |
| 6,330,543 B1 | 12/2001 | Kepecs |
| 6,332,131 B1 * | 12/2001 | Grandcolas et al. .......... 705/35 |
| 2002/0147658 A1 | 10/2002 | Kwan |

Consumer Shopping 24

Fig. 7

Name
Address
City, State Zip
Daytime Phone
Evening Phone   66

Fig. 8

TERMS  68
- You agree to pay for the purchase.
- You are the responsible party for chosen payment method.
- You are at least 18 years of age.
- You authorize the authorization or validation of chosen payment method.
- You authorize the capture of information for the express purpose of authorization or validation of payment method.

ACCEPT —70    DECLINE —72

Fig. 9

CHOOSE A PAYMENT METHOD:  74

76— VISA          MASTERCARD —78
80— AMEX          PHONE BILL —84
        BANK ACCOUNT —82

Fig. 10

| Account Number | Statement Date | Page 1 _34_ |
|---|---|---|
| | Dec 4, 2002 | |
| Questions about your bill? | 1-800-000-0000 | |

XYZ

| Total Current Charges (See detail below) | $106.11 |
|---|---|

Billed on Behalf of xyz.com

| Description | Amount: |
|---|---|
| 1. Dec 3 XYZ ISP ACCESS | $9.91 |
| 2. Dec 3 ONLINE SERVICE | $4.91 |
| 3. Dec 3 DSL LINE CHARGE | $29.91 |
| 4. Dec 3 UNIFIED MESSAGING | $5.95 |
| 5. Dec 3 WEB HOSTING | $20.00 |

| Total Monthly Chargers | $70.80 |
|---|---|

Billed on Behalf of INTERNET TELEPHONY PROVIDER

| | Date | Time | Place and Number Called | Type | Rate | Minutes | Amount |
|---|---|---|---|---|---|---|---|
| 6. | Nov.8 | 3:37 pm | Anywhere, USA 444 555-7777 | Direct | Day | 6 | .42 |
| 7. | Nov.10 | 3:37 pm | Anywhere, USA 444 555-7777 | Direct | Day | 10 | .70 |
| 8. | Nov.14 | 3:37 pm | Anywhere, USA 444 555-7777 | Direct | Day | 7 | 1.61 |
| 9. | Nov.16 | 3:37 pm | Anywhere, USA 444 555-7777 | Direct | Day | 23 | .49 |
| 10. | Nov.21 | 3:37 pm | Anywhere, USA 444 555-7777 | Direct | Day | 50 | 3.92 |

| TotalCalls | $7.14 |
|---|---|

Billed on Behalf of INTERNET SERVICE PROVIDER

| 11. | Nov.14 | 2:32 pm | Online Games | 444 555-7774 | Direct | Day | 1 | $6.00 |
|---|---|---|---|---|---|---|---|---|
| 12. | Nov.16 | 2:37 pm | Software | 444 555-7771 | Direct | Day | 1 | $14.95 |
| 13. | Nov.21 | 5:17 pm | MPS Smooth Jazz | 444 555-7772 | Direct | Eve | 1 | $8.99 |

| TotalCalls | $24.94 |
|---|---|

Taxes & Surcharges
Description

| | Ammount |
|---|---|
| 14. Charges for Network Access for Interstate Calling. · Imposed by Federal Communications Commission | $3.50 |

Fig. 16

METHOD AND SYSTEM FOR PROCESSING A TRANSACTION

FIELD OF THE INVENTION

The present invention relates generally to transaction processing and, more specifically, to processing a transaction between a vendor and a user via an electronic terminal connected by a communication line to a communication network.

BACKGROUND OF THE INVENTION

An increasing number of vendors are offering goods and/or services which may be purchased via a communication network such as a telecommunication network. For example, a purchaser may conduct a transaction via a subscriber line using a landline telephone or a personal computer via the Internet. Conventionally, credit or debit card details are furnished by the purchaser to the vendor to effect payment for the goods and/or services. As many purchasers are hesitant to supply credit or debit card details over a communication network, an alternate method of payment would be advantageous. However, if an alternate method is used, verification of the payment method should preferably take place prior to concluding the transaction.

SUMMARY OF THE INVENTION

In accordance with the invention, there is provided a method of processing payment for a transaction, the method including:

providing a user with an option, via an electronic terminal, to select payment for the transaction from an account associated with a communication line to which the electronic terminal is connected;

receiving a user request entered into the terminal to process payment from the account;

investigating data associated with the communication line; and selectively approving the transaction dependent upon an outcome of the investigation.

Further in accordance with the invention, there is provided a method of modifying a financial instrument record, the method including:

receiving transaction data entered into an electronic terminal connected via a communication line to a communication network;

obtaining a unique identifier associated with the communication line; and combining the unique identifier and the transaction data to form a financial instrument record.

Still further in accordance with the invention, there is provided a method of validating a transaction conducted using an electronic terminal connected via a subscriber line to an electronic network, the method including:

receiving a financial instrument record associated with the transaction;

extracting a unique identifier from the financial instrument record, the unique identifier being associated with the communication line; and interrogating at least one database based on the unique identifier to obtain data associated with the subscriber line and selectively generating a validation status.

The invention extends to a transaction processing system for processing a transaction between a vendor and an electronic terminal connected via a communication line to a communication network, the system including:

an application interface for providing a user, via the electronic terminal, with an option to select payment for the transaction from an account associated with the communication line, and receiving a user request entered into the terminal to process payment from the account; and a modification module connected to the application interface, the modification module generating a record which includes a unique identifier associated with the communication line and communicating the record to a validation module which validates the transaction based on data associated with the unique identifier.

The invention also extends to a transaction processor interface for processing payment of a transaction, the interface including:

an application interface for providing a user with an option, via an electronic terminal, to select payment for the transaction from an account associated with a communication line to which the electronic terminal is connected, and for receiving a user request entered into the electronic terminal to process payment from the account; and a modification module for creating a financial instrument record which includes a unique identifier associated with the communication line.

The invention extends further to a transaction validation module for validating a transaction conducted using an electronic terminal connected via a communication line to an electronic network, the module including:

an extraction module for extracting a unique identifier from a financial instrument record associated with a transaction, the unique identifier being associated with the communication line; and a processor module for interrogating at least one database based on the unique identifier to obtain data associated with the communication line and selectively generating a validation status.

Further in accordance with the invention, there is provided a computer program product including a medium readable by a processor, the medium carrying instructions which, when executed by the processor, cause the processor to:

provide a user with an option, via an electronic terminal, to select payment for a transaction from an account associated with a communication line to which the electronic terminal is connected;

receive a user request entered into the terminal to process payment from the account;

investigate data associated with the communication line; and selectively approve the transaction dependent upon an outcome of the investigation.

Still further in accordance with the invention, there is provided a computer program product including a medium readable by a processor, the medium carrying instructions which, when executed by the processor, cause the processor to:

receive transaction data entered into an electronic terminal connected via a communication line to a communication network;

obtain a unique identifier associated with the communication line; and combine the unique identifier and the transaction data to form a financial instrument record.

Still further in accordance with the invention, there is provided a computer program product including a medium readable by a processor, the medium carrying instructions which, when executed by the processor, cause the processor to:

receive a financial instrument record associated with a transaction conducted using an electronic terminal connected via a subscriber line connected to a communication network;

extract a unique identifier from the financial instrument record, the unique identifier being associated with the communication line; and interrogate at least one database based on the unique identifier to obtain data associated with the unique identifier and selectively generate a validation status.

Other features of the present invention will be apparent from the accompanying drawings and from the detailed description which follows.

BRIEF DESCRIPTION OF THE DRAWINGS

The invention is now described, by way of non-limiting example, with reference to the accompanying diagrammatic drawings.

In the drawings,

FIG. 7 shows a schematic representation of a client interface in the form of an electronic terminal used to conduct the transaction;

FIG. 8 shows a schematic representation of a screen display or layout provided at the client interface;

FIG. 9 shows a schematic representation of a further screen layout provided at the client interface;

FIG. 10 shows a schematic representation of a screen display at the client interface for choosing a payment method;

FIG. 16 shows a schematic representation of a sample telephone bill platform or account which the system automatically updates.

DETAILED DESCRIPTION

Figure 1:
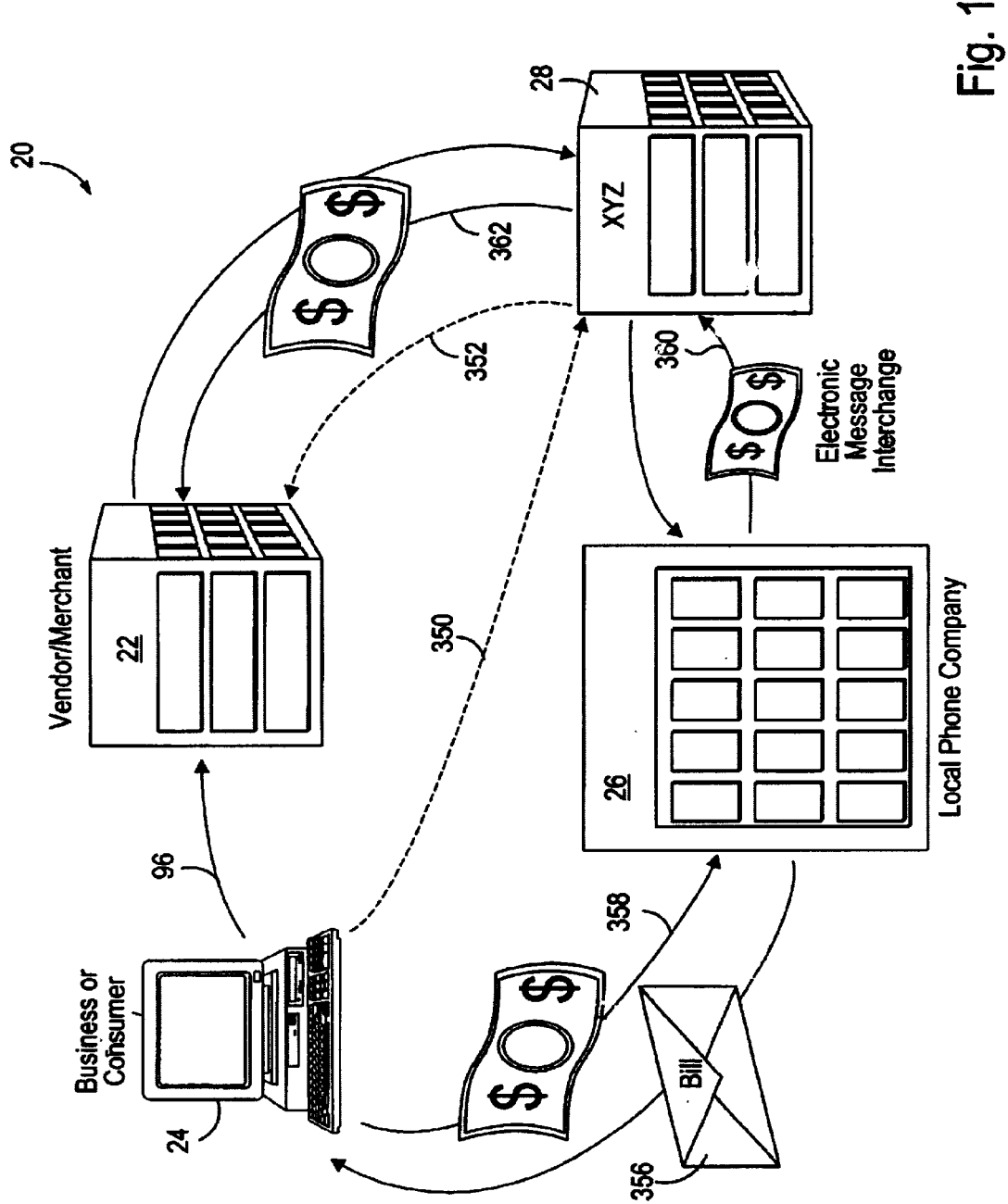
FIG. 1 shows a schematic block diagram of a system, in accordance with the invention, for processing a transaction.

Referring to the drawings, reference numeral 20 general indicates a system for processing payment of a transaction. The system 20 includes a merchant or vendor 22, a plurality of client interfaces in the form of electronic terminals 24 (only 1 of which is shown in the drawings), a plurality of telephone companies (Telcos) 26 (only 1 of which is shown in the drawings), and a transaction validation and processing facility 28 including a transaction validation and processing module 30 (see FIG. 6), also in accordance to the invention. The vendor 22 includes a transaction processor interface defined by an application interface and modification module 32 (see FIG. 5) and, as will be described in more detail below, the system 20 with its transaction validation and processing module 30 allows a user to purchase goods and/or services from the vendor 22 via the electronic terminal 24 in such a fashion so that charges for the transaction are included in a telephone account 34 (see FIG. 16) of the user.

The system 20 is typically configured for use in an Internet environment in which a plurality of vendors 22 offer goods and/or services for sale on the Internet via the electronic terminals 24 which are typically personal computers (PCs). It is important to appreciate that the modules 30, 32 describe functional modules or capabilities which may be implemented by a variety of different hardware and software combinations.

Figure 2:
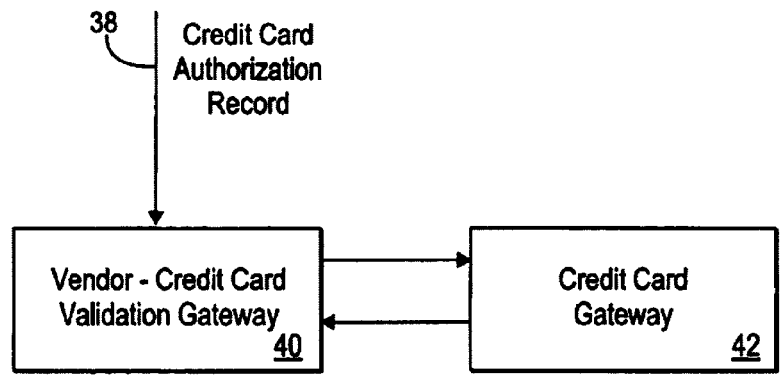
FIG. 2 shows a schematic block diagram of a method used in the prior art to process a transaction electronically.

Conventionally, and as shown in FIG. 2, in order to procure payment for goods and/or services, a user or purchaser using the electronic terminal 24 enters financial card details, e.g., credit card, debit card, or any other financial instrument details, which are then communicated (see line 38 in FIG. 2) to a vendor, as shown at 40, which then communicates with a credit card gateway 42. The credit card gateway 42 may then either accept or reject the transaction. However, many users are unwilling to submit financial card information to vendors, inter alia, for security reasons. Further, many users who have access to the Internet do not in fact possess financial cards (hereinafter referred to as credit cards) and are thus unable to transact via the Internet.

Figure 3:
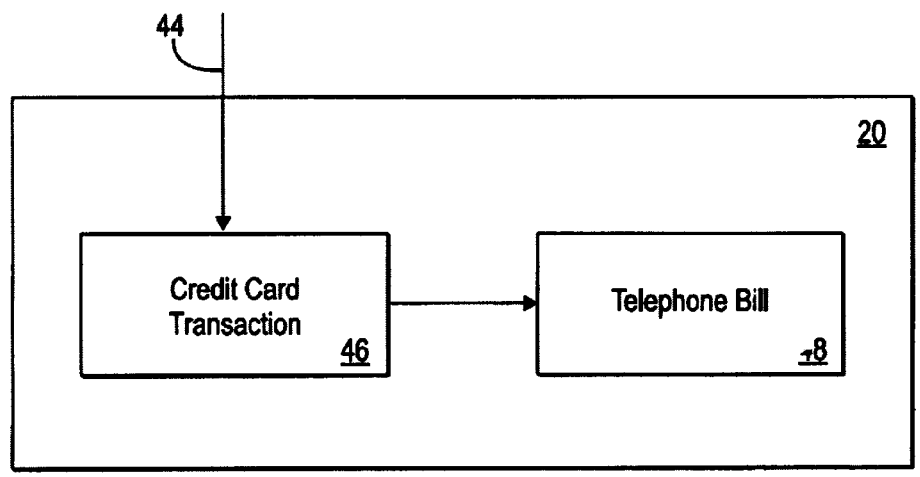
FIG. 3 shows a schematic block diagram of a method, in accordance with the invention, for processing a transaction.
Figure 4:
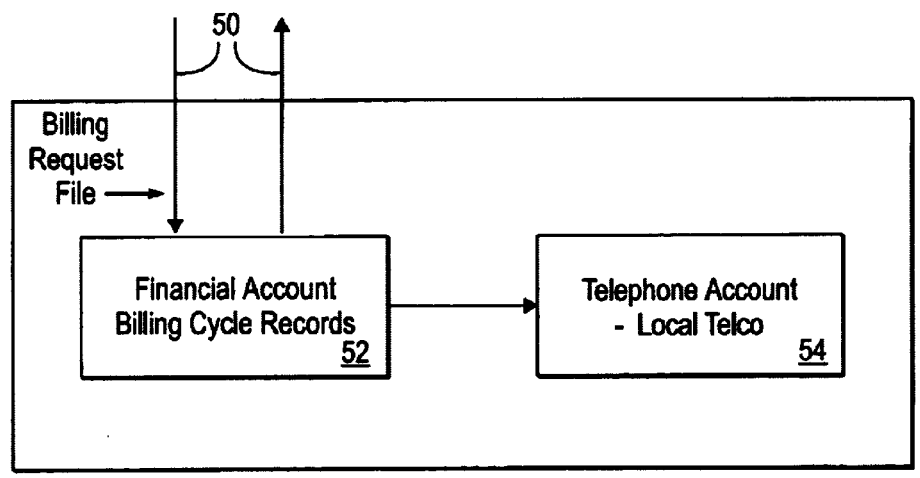
FIG. 4 shows a schematic block diagram of a billing cycle used in the method of FIG. 3.

Referring in particular to FIG. 3 of the drawings, in one embodiment of the invention the system 20 receives transaction data 44 which is then formatted substantially to resemble a conventional credit card transaction 46 which is then converted or modified and payment for the transaction is included in a telephone bill or account as shown at block 48. As will be described in more detail below, each particular transaction or billing event is not immediately included in the telephone account 34 at the Telco 26, but during a billing cycle (see FIG. 4) which occurs periodically, e.g., daily, weekly, monthly or at any other interval. Accordingly, communications 50 take place during billing events between the transaction validation and processing facility 28 and the vendor 22 and a record of each transaction is kept at the facility 28 as shown by block 52 in FIG. 4. The facility 28, with its transaction validation and processing module 30, in an automated fashion at the end of a billing cycle, processes the transactions into the relevant telephone accounts at the relevant Telcos 26 as shown at block 54.

Figure 5:
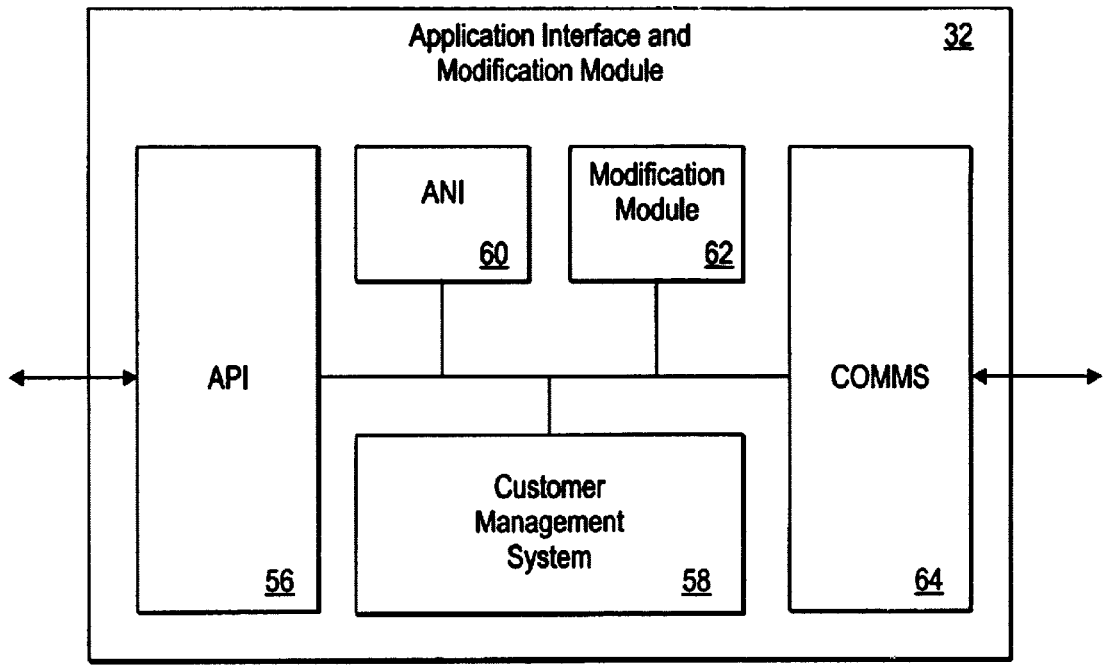
FIG. 5 shows a schematic block diagram of functional modules, also in accordance with the invention, used by a vendor.
Figure 6:
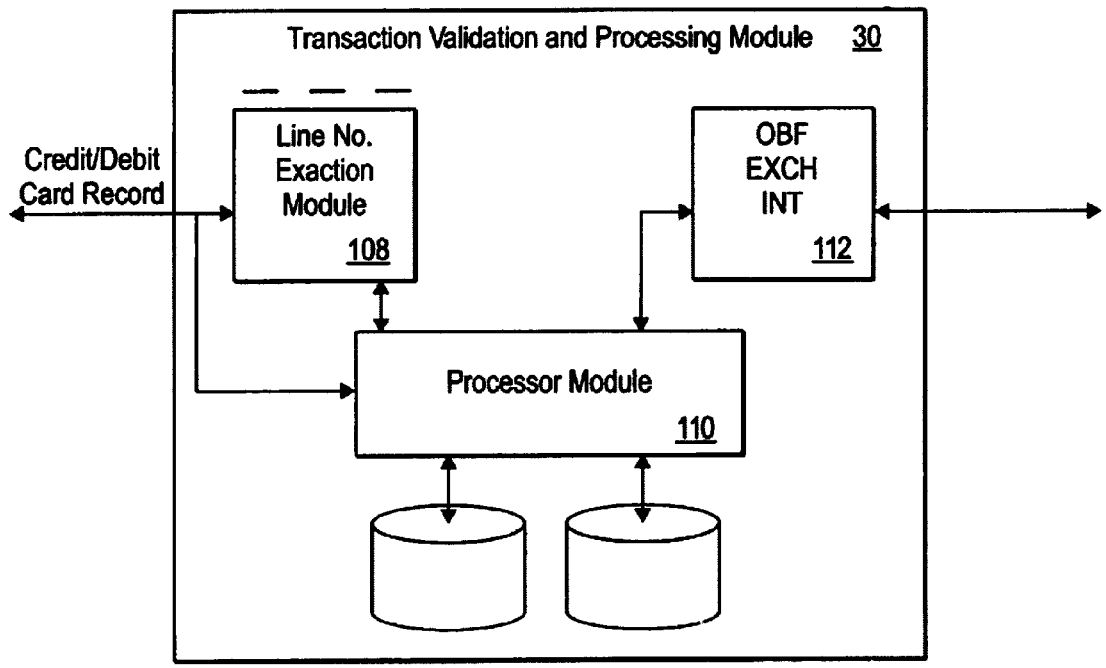
FIG. 6 shows a schematic block diagram of transaction validation and processing modules, also in accordance with the invention, used in the system.

Referring in particular to FIG. 5 of the drawings, the vendor 22 uses the application interface and modification module 32 to interface to the communication network, typically the Internet, so that the user may communicate with the vendor 22 via the electronic terminal 24. The module 32 includes an application interface (API) 56, a customer management system (CMS) 58, an automatic number identification (ANI) module 60, a modification module 62, and a communication module 64. The communication module 64 is configured to communicate with the transaction validation and processing module 30, which is typically located offsite. In use, the API 56 provides the electronic terminal 24 with a user interface whereby the user can purchase goods and/or services and this may be provided in a conventional fashion. Once the user has selected the goods and/or services he or she wishes to purchase, the API 56 communicates a display screen or form 66 to the electronic terminal 24 as shown in FIG. 8. Typically, the API 56 requests the user to enter into the form 66 name, address, city, state, zip, day time phone number, evening phone number, or the like information. Typically, the evening phone number defines a billing telephone number (BTN) which is associated with the telephone account 34. Thereafter, the various terms and or conditions of the transaction are communicated to the user in the form of a display screen 68 as shown in FIG. 9. The user is then compelled either to accept or decline the terms by activating buttons 70, 72 respectively, typically by means of a mouse or pointing device in a conventional fashion.

Once the user has accepted the terms, the API 56 then provides the user with a display screen 74 which allows the user to select various different methods of payment for the transaction. For example, the display screen 74 includes a "Visa" button 76, a "MasterCard" button 78, "American Express" button 80, and a "bank account" button 82. However, unlike conventional systems, the system 20 provides the user with a "phone bill" button 84 whereby the user can charge the transaction to the telephone account 34 (see FIG. 16).

Figure 11:
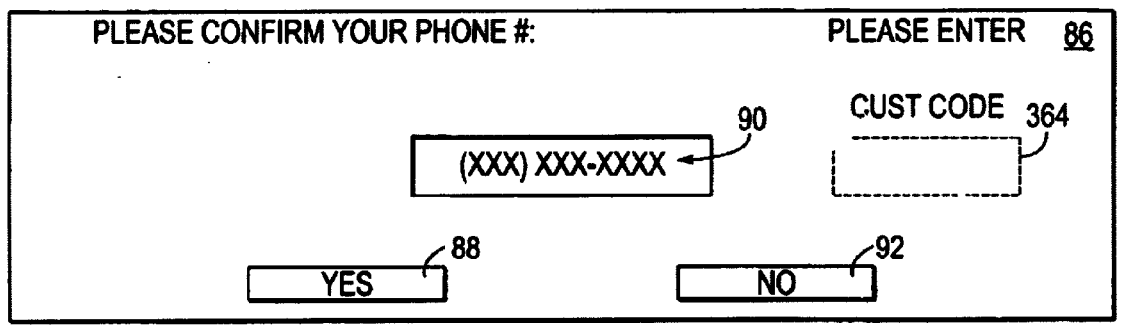
FIG. 11 shows a schematic representation of a screen display at the client interface for confirming a billing telephone number (BTN)
Figure 12:
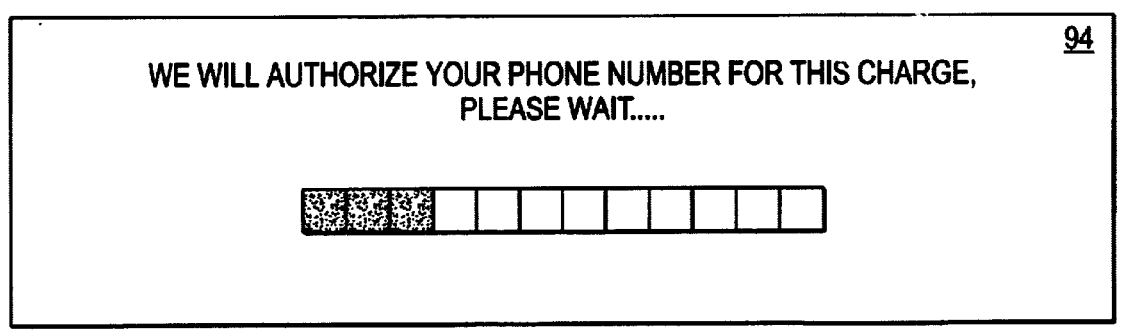
FIG. 12 shows a schematic representation of a screen display at the client which is displayed whilst validation of the client telephone number takes place.

If the user selects the option to pay via the telephone account 34 by activating the "phone bill" button 84, the API 56 then provides the user with a screen display 86 (see FIG. 11) which requests the user to confirm the BTN associated with the telephone account 34. The screen display 86 includes a "yes" button 88 for the user to confirm the telephone number which is shown at 90, and a "no" button 92 which is activated in the event of the telephone number being incorrect. If the telephone number shown at 90 is incorrect, the user then is prompted to re-enter a corrected telephone number. Once the user has activated the "yes" button 88, the API 56 then communicates a display screen 94 to the electronic terminal 24 to advise the user that he or she should wait while the request is authorized. It is to be appreciated however that the description above is merely an example of how a user may be provided with various interfaces to allow the user to select a mode or method of payment associated with the telephone account 34. Those skilled in the art will appreciate that user data may be obtained in a variety of different ways. For example, an application may be downloaded to the electronic terminal 24 which requests and obtains the relevant data from the user and which is then subsequently communicated to the vendor 22.

The BTN which the user enters into the form 66 should correspond with the subscriber line 96 (see FIG. 1) via which the electronic terminal 24 is connected to the communication network. Accordingly, the ANI module 60 automatically identifies or determines the telephone number of the subscriber line 96 so that a comparison between the two can be made. The BTN thus defines a unique identifier associated with the communication line and with which the telephone account 34 corresponds.

Figure 13:
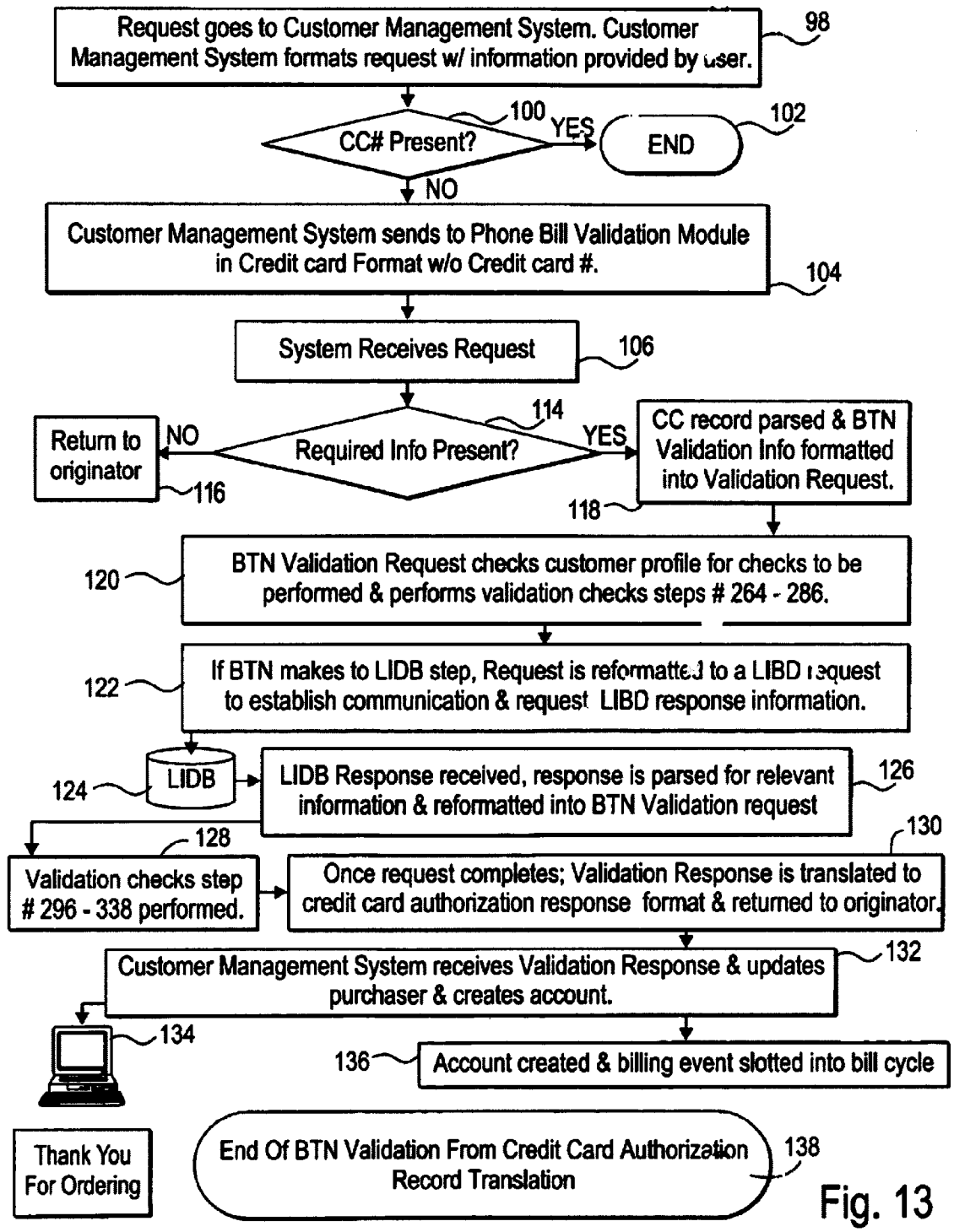
FIG. 13 shows a schematic representation of a flow diagram illustrating the validation process.

The user's request, via the electronic terminal 24 and via the subscriber line 96 (which may be any communication line associated with the account 34), is then communicated to the CMS 58 which then formats the request to form a request record with information provided by the user via the electronic terminal 24 (see block 98 in FIG. 13). As shown at decision step 100, the module 32 checks to determine whether or not a credit card number is present in the record and, if so, the record is communicated to a credit card gateway for processing in a conventional fashion and the procedure terminates as shown at step 102. This situation typically arises when the user has not selected the telephone account option by activating the "phone bill" button 84 but, instead, selected one of the other methods of payment, e.g., the "Visa" button 76, the "MasterCard" button 78, the "American Express" button 80, or the "bank account" button 82.

However, if the "phone bill" button 84 has been activated and a credit card number is not present in the record, the CMS 58, in combination with the modification module 62, modifies the credit card record to include the telephone number identified by the ANI module 60. Accordingly, the credit card or financial record communicated from the vendor 22 to the transaction validation and processing facility 28 substantially resembles a conventional or industry standard credit card record except that, instead of a credit card number, the telephone number associated with the subscriber line 96 is included (see step 104). In the embodiment of the invention in which the credit card number has been replaced with the telephone number, and as the record substantially resembles and industry standard credit card record, existing or conventional customer management systems may be used to process the transaction. Thus, the CMS 58 may be a conventional customer management system.

The application interface and modification module 32 of the vendor 22, communicates the transaction record to the transaction validation and processing module 30 of the facility 28 via the communication module 64. The module 30 then receives the record as shown at step 106 whereafter it is processed. The transaction validation and processing module 30 (see FIG. 6) includes a line number extraction module 108, a processor module 110, and an OBF exchange interface 112. It is important to appreciate that the application interface and modification module 32 and the transaction validation and processing module 30 may be defined by one or more servers which are programmed appropriately. Thus, the blocks or modules may represent functional components of software running on the server. Typically, each vendor 22 has a server programmed and configured to implement the application interface and modification module 32 and the vendors 22 are connected via a communications network to a central transaction processing and validation facility 28. Accordingly the servers at the facility 28 may receive validation and processing requests from a plurality of different offsite servers provided at different vendors 22.

The processor module 110 first checks, at step 114, if all the information required for validation has been furnished by the vendor 22 and, if not, the request is returned to vendor 22 as shown in step 116. If, however, all the information required by the module 30 is present in the record, the credit card record received is then parsed and the billing telephone number (BTN) is extracted from the credit card record and formatted into a validation request as shown at step 118. Thereafter, as described more detail in FIGS. 13 and 14, the module 30 performs various checks during which the subscriber line 96 is validated (see step 120). If the BTN progresses to a LIDB interrogation step (as described in more detail below with reference to steps 264 to 286 in FIG. 17), the request is then reformatted into a LIDB request to obtain LIDB response information (see step 122). The LIDB database 124 (see FIG. 13) is then interrogated and the LIDB response is received and parsed for relevant information whereafter it is reformatted into a BTN validation request as shown at step 126. Thereafter, and as described in more detail below with reference to FIGS. 18 and 19, the processor module 110 performs further validation checks (see step 128 in FIG. 13 and steps 296 to 338 in FIGS. 18 and 19). Once the request has been investigated, the various databases have been interrogated, and the results retrieved therefrom processed, the processor module 110 then translates the validation response in to a credit card authorization response format, which is typically a conventional or industry standard format so that an industry standard or conventional CMS 58 can process the response. The response is then communicated from the facility 28 to the vendor 22 (see step 130). The CMS 58 then receives the reformatted response, updates purchase data, and creates an account for the user as shown in step 132. Thereafter, the API 56 communicates a display screen 134 to the electronic terminal 24 which thanks the user for ordering the good and/or services. Each transaction defines a billing event which is recorded at the vendor 22 and, together with other billing events, is communicated to the facility 28 at the end of a billing cycle (see block 136). Typically, this marks the end of the BTN validation procedure from the credit card authorization record translation as shown at block 138.

The method described above broadly translates a record requiring validation from an existing financial instrument form, e.g., a credit card form, to a form that is suitable to be validated based on a unique identifier associated with the subscriber line 96. Although the description above, and the more detailed description below, describe the translation from a credit card record to an appropriate record to validate a ANI/BTN, it is to be appreciated that any data associated with a financial instrument may be translated into a BTN format and, in response to validation of the BTN, the transaction may be processed. Further, the validation of the BTN may take place one or more times during the life cycle of a transaction. For example, the validation process may be executed when the user or customer request the transaction to be included in the telephone account 34 as described above and, when the facility 28 receives a plurality of billing events or transactions at the end of a bill cycle, the facility 28 may once again validate the transaction.

In certain embodiments, the user or purchaser drives an authorization event in order to establish whether or not the transaction can be billed to the telephone account 34. In this case, the Billing Telephone Number (BTN) defines the credit instrument requiring authorization for billing. The CMS 58 may then drive the request to the facility 28 in the same format as it would to a Credit Card Authorization System. An example of the conversion of a credit card billing request to a BTN validation record is described in more detail below.

1. Credit Card Authorization Request to Billing Telephone Number Validation Request

| Credit Card Authorization Request Record |
| --- |
| 99m999999123456.........2022269329Ebillittestregistration   12345 Main Street          apt 12 |
| Any City          CA9505107892022269329301559199200002695 |

| Billing Telephone Number Validation Request Record |
| --- |
| 99m9999999999992022269329 12345Main StreetCA 9505107892022269329 |

| Credit Card Authorization Record | | | Billing Telephone Number Validation Record | | |
| --- | --- | --- | --- | --- | --- |
| Position | Field | Example | Positon | Field | Example |
| 1–15 | Tracking ID | 99m999999123456 | 1–15 | Tracking ID | 99m999999123456 |

| Position | Field | Value |
|---|---|---|
| 16–35 | CREDIT # | 2022269329 |
| 36–65 | NAME | Ebillittestregistration |
| 66–105 | ADDRESS1 | 12345 Main Street |
| 106–125 | ADDRESS2 | Apt 12 |
| 126–155 | CITY | Any City |
| 156–157 | STATE | CA |
| 158–163 | ZIP | 95051 |
| 164–168 | Zip + 4 | 0789 |
| 169–178 | BTN | 2022269329 |
| 179–188 | EVENING # | 3015591992 |
| 189–195 | AMOUNT | 0002695 |
| 16–25 | ANI* | 2022269329 |
| 26–56 | ADDRESS1 | 12345 Main Street |
| 57–58 | STATE | CA |
| 59–63 | ZIP | 95051 |
| 64–67 | Zip + 4 | 0789 |
| 68–77 | BTN | 2022269329 |

2. Billing Telephone Number Validation to a LIDB Request Record

If the Phone number passes a series of validation checks, it will then be checked against the LIDB database. In order to do that, the record must be translated in to a format specific for the LIDB process.

Billing Telephone Number Validation Request Record

99m9999991234562022269329 12345Main StreetCA 95051078 92022269392

LIDB Request Record

DR1100333333330200021234561010914132401;;102022269329

| Billing Telephone Number Validation Record | | | LIDB Request Record | | |
|---|---|---|---|---|---|
| Positon | Field | Field | Positon | Field | Example |
| 1–15 | Tracking ID | 99m999999123456 | 1–2 | MESSAGE ID | DR |
| 16–25 | ANI* | 2022269329 | 3–6 | FIELD BIT MAP | 1100 |
| | | | 7–14 | CUST ID | 33333333 |
| 26–56 | ADDRESS1 | 12345 Main Street | 15–18 | MESSAGE TYPE | 0200 |
| | | | 19–20 | LTRANS TYPE | 02 |
| | | | 21–26 | SEQ # | 123456 |
| 57–58 | STATE | CA | 27–27 | DATA INDICATOR | 1 |
| 59–63 | ZIP | 95051 | 28–33 | DATE | 010914 |
| 64–67 | Zip + 4 | 0789 | 34–39 | TIME | 132401 |
| 68–77 | BTN | 2022269329 | 40–42 | END OF HEADER | ;; |
| | | | 43–45 | ACCT # LENGTH | 10 |
| | | | 46–55 | ACCT # | 2022269329 |

3. LIDB Response Record to a BTN Validation Record

Once the information is received from LIDB, the record must be translated back into a format that the Phone Number Validation System can read so the process can continue with additional checks to the phone number.

LIDB Response Record

DR0210333333330200021234561010914132416;;20222693292019417998

Billing Telephone Number Validation Request Record

99m9999991234562022269329 12345Main StreetCA 950510789202226932920 19417998

| LIDB Response Record | | | Billing Telephone Number Validation Record | | |
|---|---|---|---|---|---|
| Positon | Field | Example | Positon | Field | Example |
| 1–2 | MESSAGE ID | DR | 1–15 | Tracking ID | 99m999999123456 |
| 3–6 | FIELD BIT MAP | 0210 | 16–25 | ANI* | 2022269329 |
| 7–14 | CUST ID | 33333333 | | | |
| 15–18 | MESSAGE TYPE | 0200 | 26–56 | ADDRESS1 | 12345 Main Street |

-continued

| | | | | | |
|---|---|---|---|---|---|
| 19–20 | TRANS TYPE | 02 | | | |
| 21–26 | SEQ # | 123456 | | | |
| 27–27 | DATA INDICATOR | 1 | 57–58 | STATE | CA |
| 28–33 | DATE | 010914 | 59–63 | ZIP | 95051 |
| 34–39 | TIME | 132416 | 64–67 | Zip + 4 | 0789 |
| 40–42 | END OF HEADER | ;; | 68–77 | BTN | 2022269392 |
| 43–52 | ACCT # | 2022269329 | | | |
| 53–55 | RESPONSE CDOE | 201 | 78–80 | RESPONSE CDOE | 201 |
| 56–59 | PHONE COMPANY # | 9417 | 81–84 | PHONE COMPANY # | 9417 |
| 60–62 | PHONE COMPANY # | 998 | 85–87 | PHONE COMPANY # | 998 |

4. BTN Validation Response Record to a Credit Card Authorization Response Record At the conclusion of the Phone Number Validation Process, the results must be sent back to the CM System so the results can be returned to the purchaser and updated in the CM System. The BTN Validation response must be converted to a format that the CM can interpret. The BTN Validation Response Record is translated to the Credit Card Authorization Response Record for this phase of the purchase.

| Billing Telephone Number Validation Response Record |
|---|
| 99m9999991234562022269329180201N2Y5552269329YY |

| Credit Card Authorization Response Record |
|---|
| 99m999999123456..........2022269329201N25552269329YY |

| Billing Telephone Number Validation Record | | | Credit Card Authorization Record | | |
|---|---|---|---|---|---|
| Positon | Field | Example | Positon | Field | Example |
| 1–15 | Tracking ID | 99m9999991234 56 | 1–15 | Tracking ID | 99m999999123456 |
| 16–25 | BTN | 2022269329 | 16–35 | CREDIT # | 2022269329 |
| 26–28 | BTN VAL RESPONSE CODE | 180 | 36–41 | RESPONSE CODE | 201N2 |
| 28–32 | CC RESPONSE CODE | 201N2 | 42–51 | NEW PHONE # | 5552269329 |
| 35–35 | AREA CODE CHANGE | Y | 52–52 | BUSINESS LINE | Y |
| 36–45 | NEW PHONE # | 5552269329 | 53–53 | ACCT < 90 DAYS | Y |
| 46–46 | BUSINESS LINE | Y | | | |
| 47–47 | ACCT < 90 DAYS | Y | | | |

Figure 14:
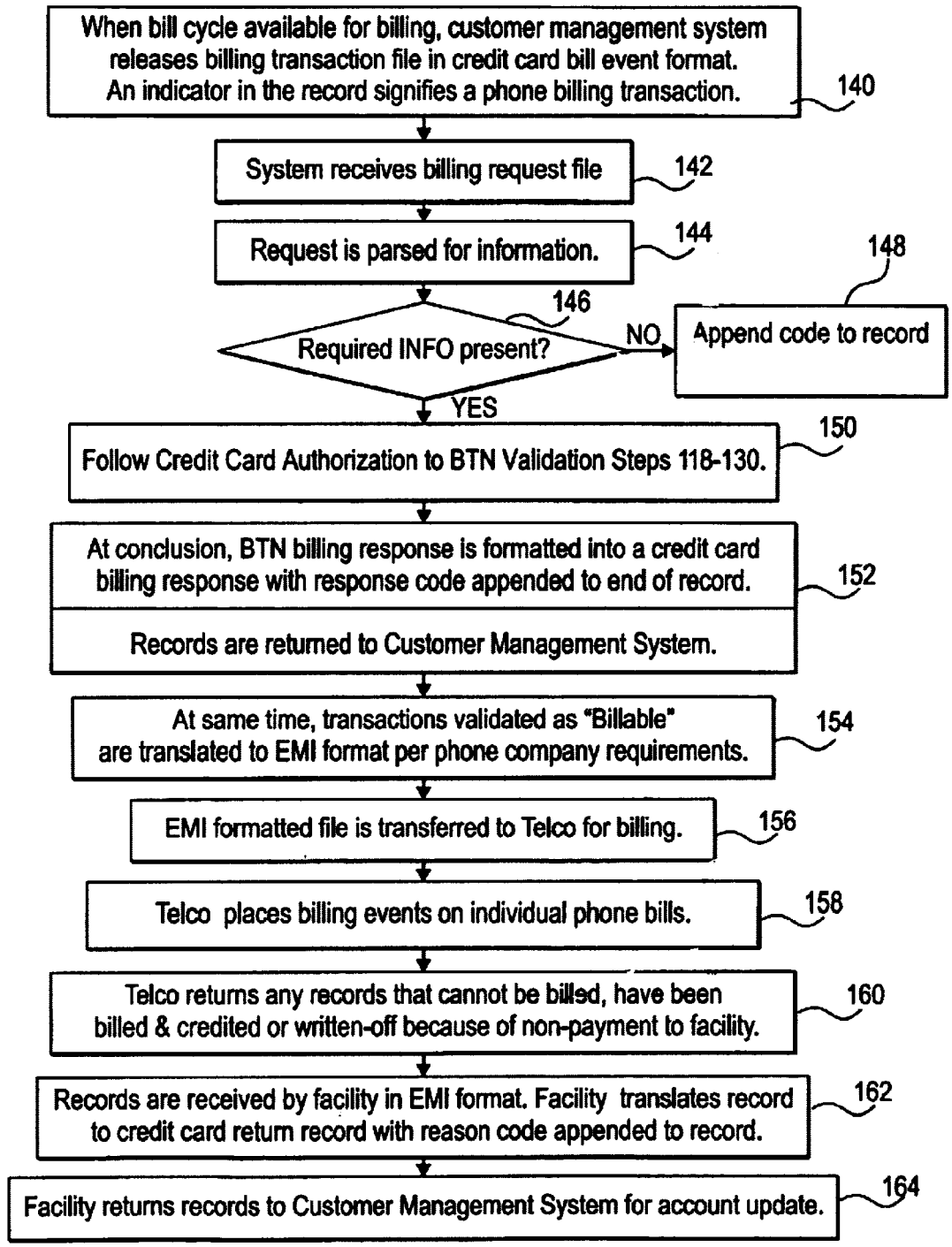
FIG. 14 shows a schematic flow diagram of a bill cycle transaction event.

Referring in particular to FIG. 14 of the drawings, at the end of a bill cycle during which a plurality of transactions or billing events or transactions have been recorded by the CMS 58, the CMS 58 communicates a billing transaction file in a credit card bill event format to the facility 28 (see step 140 in FIG. 14). Each event in the transaction file includes an indicator to indicate that the event is a phone billing transaction for inclusion in the telephone account 34. The module 30 of the facility 28 then receives the billing request file as shown at step 142, whereafter the request file is parsed, as shown at step 144, and the processor module 110 checks to see whether or not all the required information is present in the file (see step 146). If not, a code is appended to the record as show at step 148. If all the information is present in the file, the process then proceeds to step 150 where the credit card authorization to BTN validation steps 118–130, as described above, are executed. Once the validation procedure has been completed, the BTN billing response is formatted into a industry standard credit card billing response with a response code appended to the end of each record and, the records are then returned to the CMS 58 (see step 152).

At the same time, transactions or billing events which have been validated as billable and thus capable of being included in the relevant telephone account 34, are translated into an electronic message interface (EMI) format appropriate for the Telco with which the telephone account 34 is associated (see step 154). The EMI formatted file is then transferred to the Telco for billing as shown in step 156 whereafter the Telco call places each billing event on telephone account 34 associated with the subscriber line 96. Typically, the Telco returns any records that can not be billed to the telephone account 34 or that have already been billed and credited, or written off because of non payment to the facility 28 as shown at step 160. The records received by the facility 28 are in the EMI format and the facility 28 translates the record to a credit card return record including a reason code appended to the record, as shown at step 162, whereafter record is returned to the CMS 58 at the vendor 22.

An example of the billing event record conversion in which a credit card billing request is translated into a BTN billing request is set out below.

1. Credit Card Billing Request to a BTN Billing Request

Once the purchase event has been slotted for billing, it enters the billing stream for that bill cycle. In certain embodiments, daily bill cycle records are sent to the appropriate processors. As described above, the transaction validation and processing module 30 may receive the record in the same format required by a conventional credit card processing facility.

In certain embodiments, the first step in the bill cycle is to re-validate the billable status of the BTN. This is done by following the same steps in the BTN Validation process set out above. The first step is to convert the record to a BTN Validation event record.

Credit Card Billing Request Record

S749499M4N0000107252E100BP2623775174  0000  0004500
ABPAT*MOORE            H2624444444
A2888 NW 87th REGENCY CIRCLE    D2623775174
A3CEADARBURG, WI 53012-0505

Billing Telephone Number Validation Request Record

749499M4N0000107252E1002022269329000450088WI531020505B

| Credit Card Authorization Record | | | Billing Telephone Number Validation Record | | |
|---|---|---|---|---|---|
| Positon | Field | Example | Positon | Field | Example |
| 1–1 | Bill Event | S | 1–15 | Tracking ID | 749499M4N0000107252E100 |
| 2–7 | Merchant ID | 749499 | 16–25 | BTN | 2623775174 |
| 8 | YEARS IN BUSINESS | M (13th year) | 26–33 | AMOUNT | 0004500 |
| 9–10 | MONTH, DAY | 4N (April 14th) | 34–43 | ADDRESS1 | 888....... |
| 11–20 | ACCT # | 0000107252 | 44–45 | STATE | WI |
| 21–24 | | E100 | 46–50 | ZIP | 53102 |
| 25–25 | RECORD TYPE | B | 51–54 | ZIP + 4 | 0505 |
| 26–26 | BILL TYPE | P | 55–55 | RECORD TYPE | B |
| 27–46 | BTN | 2623775174 | | | |
| 47–54 | AMOUNT | 000004500 | | | |
| 1–2 | ACCT INFO | AB | | | |
| 3–32 | NAME | PAT MOORE | | | |
| 33–43 | HOME # | H2624444444 | | | |
| 44–45 | ADDRESS INDICATOR | A2 | | | |
| 46–65 | STREET | 888 NW 87th REGENCY CIRCLE | | | |
| 66–76 | DAYTIME # | D2623775174 | | | |
| 77–78 | ADDRESS3 | A3 | | | |
| 79–108 | CITY, STATE, ZIP | CEADARBURG, WI 530120505 | | | |

2. Phone Bill Billing Record to Credit Card Billing Response Record

At the conclusion of the revalidation during the billing process, a different response record may be written to a file. That record is typically in a format according to the Credit Card Billing Response format.

Billing Telephone Number Billing Validation Response Record

749499M4N0000107252E1002623775174180201N2N0000000000NN0004500B

Credit Card Billing Response Record

S749499M4N0000107252E100BP2623775174201N2N0000000000NN

| BTN Billing Validation Response Record | | | Credit Card Billing Response Record | | |
|---|---|---|---|---|---|
| Positon | Field | Example | Positon | Field | Example |
| 1–15 | Tracking ID | 749499M4N00001072 52E100 | 1–1 | BILLING EVENT | S |

| | | | | | |
|---|---|---|---|---|---|
| | | -continued | | | |
| 16–25 | BTN | 2623775174 | 2–24 | Tracking ID | 749499M4N0000107252E100 |
| 26–28 | BTN VAL RESPONSE CODE | 180 | 25–34 | BTN | 2623775174 |
| 29–33 | CC RESPONE CODE | 201N2 | 35–39 | RESPONSE CODE | 201N2 |
| 34–34 | AREA CODE CHANGE | N | 40–40 | AREA CODE CHANGE | N |
| 35–44 | NEW PHONE # | 0000000000 | 41–50 | NEW # | 0000000000 |
| 45–45 | BUSINESS LINE | N | 51–51 | BIZ LINE | N |
| 46–46 | ACCT < 90 DAYS | N | 52–52 | ACCT < 90 DAYS | N |
| 47–53 | AMOUNT | 0004500 | | | |
| 54–54 | RECORD TYPE | B | | | |

3. BTN Billing Validation Record to a Phone Company Deposit Record

At the same time the Billing Response is returned, all accounts that were validated as positive may be formatted into a record that is acceptable at the Telephone Company for processing.

converted in to the Credit Card Negative Billing Event format for processing. In addition, any other negative information, such as a credit of a charge or the write-off of bad debt, must be converted to the appropriate Credit Card formats for processing by the CM. Thus, if inclusion into the telephone account 34 fails for some reason, the transaction Billing Telephone Number Billing Validation Response Record

749499M4N0000107252E1002623775174180201N2N0000000000NN0004500B

Phone Company Deposit Record

425001011400000000007442000000000007364004500000000000000000000000000000000000091020000000000000009030000000262377517400...000

| BTN Billing Validation Response Record | | | Phone Company Deposit Record | | |
|---|---|---|---|---|---|
| Positon | Field | Example | Positon | Field | Example |
| 1–15 | Tracking ID | 749499M4N0000107252E100 | 1–6 | RECORD TYPE | 425001 |
| 16–25 | BTN | 2623775174 | 7–11 | DATE | 101400 |
| 26–28 | BTN VAL RESPONSE CODE | 180 | 12–19 | Zero fill | 00000000 |
| 29–33 | CC RESPONSE CODE | 201N2 | 20–23 | PROCESSOR # | 7442 |
| 34–34 | AREA CODE CHANGE | N | 24–34 | Zero fill | 000000000000 |
| 35–44 | NEW PHONE # | 0000000000 | 35–38 | SUBCIC # | 7364 |
| 45–45 | BUSINESS LINE | N | 39–44 | AMT | 004500 |
| 46–46 | ACCT < 90 DAYS | N | 45–81 | Zero fill | 000...00 |
| 47–53 | AMOUNT | 0004500 | 82–85 | OCN | 9102 |
| 54–54 | RECORD TYPE | B | 86–100 | Zero fill | 000000000000000 |
| | | | 101–103 | CIC # | 903 |
| | | | 104–112 | Zero fill | 00..000 |
| | | | 113–122 | BTN | 2623775174 |
| | | | 123–175 | Zero fill | 000...000 |

4. Negative Billing Event Records to Credit Card Negative Event Records

These BTN Billing Records are deposited at a Telephone Company for processing on to the bill page. If a charge is unable to be placed on the bill page, the event must be then gets charged to the financial instrument or credit card and an industry standard credit card record is created by the module 30.

The CMS 58 typically knows how to handle the negative event by the file name that contains the records and the response code within the returned records. The file name and response codes are in the industry standard credit card processing convention.

code indicating a valid billable number or a code indicating that the line number is not a valid billable number (unbillable or non-billable). In particular, a plurality of codes Phone Company Return Record 425001011400000000000744200000000000007364004500000000000000000000000000000MO00
000000009102141000000000000090300000002623775174000....000

Credit Card Negative Event Record

S749499M4N0000107252E1002623775174201091501

| Phone Company Deposit Record | | | Credit Card Chargeback Record | | |
|---|---|---|---|---|---|
| Positon | Field | Example | Positon | Field | Example |
| 1–6 | RECORD TYPE | 425001 | 1–1 | BILLING EVENT | S |
| 7–11 | DATE | 101400 | 2–24 | Tracking ID | 749499M4N00001 07252E100 |
| 12–19 | Zero fill | 00000000 | 25–34 | BTN | 2623775174 |
| 20–23 | PROCESSOR # | 7442 | 35–37 | RESPONSE CODE | 201 |
| 24–34 | Zero fill | 000000000000 | 38–43 | RETURN DATE | 091501 |
| 35–38 | SUBCIC # | 7364 | | | |
| 39–44 | AMT | 004500 | | | |
| 45–69 | Zero fill | 000...00 | | | |
| 70–71 | REASON CODE | MO | | | |
| 72–81 | Zero fill | 000.000 | | | |
| 82–85 | OCN | 9102 | | | |
| 86–89 | NEW OCN | 1410 | | | |
| 90–100 | Zero fill | 000...000 | | | |
| 101–103 | CIC # | 903 | | | |
| 104–112 | Zero fill | 00..000 | | | |
| 113–122 | BTN | 2623775174 | | | |
| 123–175 | Zero fill | 000...000 | | | |

As mentioned above, the transaction validation and processing module 30 carries out a validation process on the telephone number associated with subscriber line 96 (see FIG. 15) and periodically processes transactions directly into subscriber telephone accounts 34.

Figure 15:
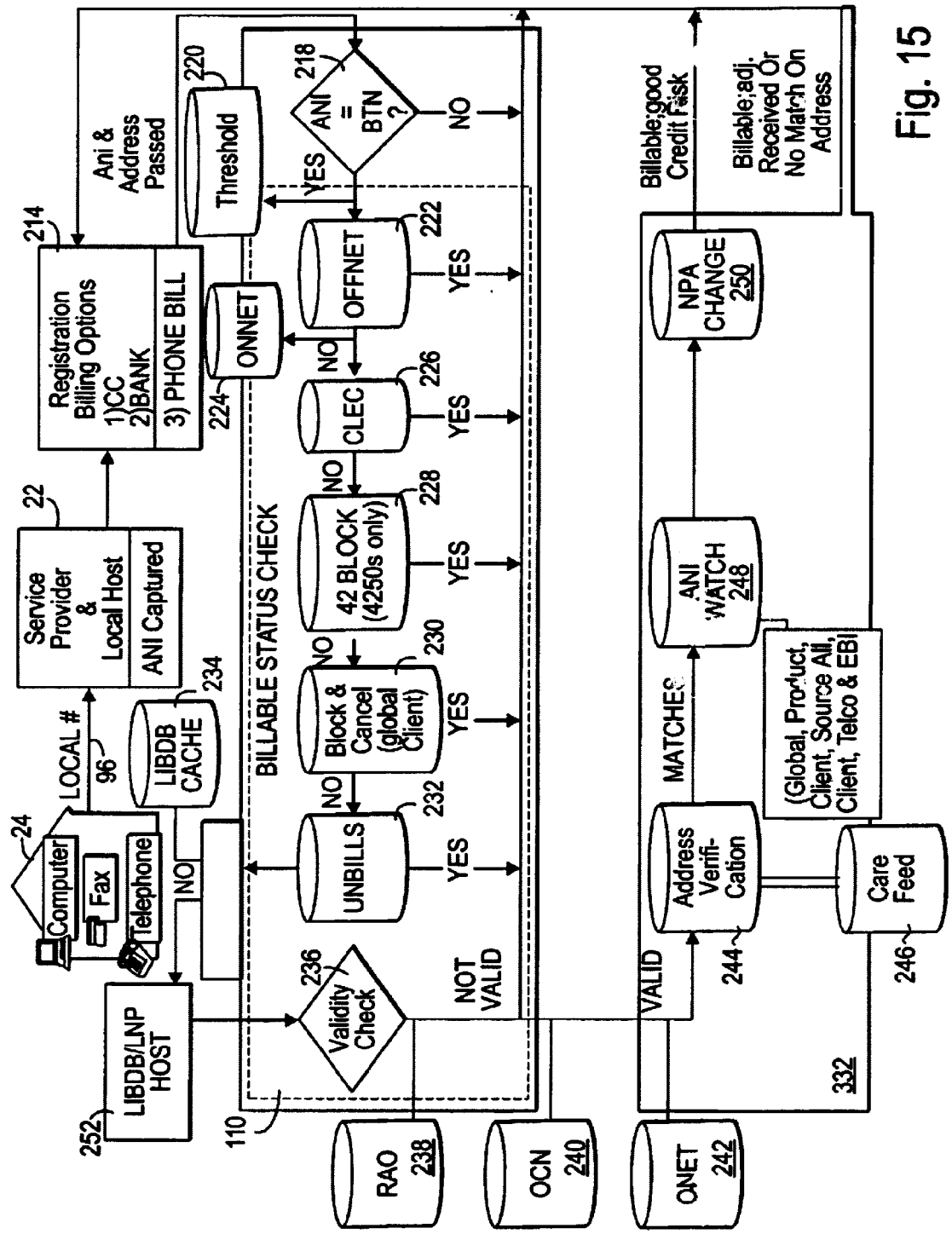
FIG. 15 shows a more detailed schematic block diagram of the transaction validation and processing modules of FIG. 6.

Referring in particular to FIG. 15 of the drawings, reference numeral 200 generally indicates a more detailed schematic block diagram of an embodiment of the module 30. In the module 200, the line number extraction module 108 and the OBF exchange interface 112 are integrated into the processor module 110 which is in the form of a server.

The module 200 includes an application program interface (API) 214 which is connected to the vendor 22 or service provider (see also FIG. 5) of goods and/or services which require validation of a subscriber account. The vendor 22, which could for example be an Internet Service Provider, may request the validation of the subscriber line 96 prior to concluding an electronic transaction with a subscriber via the subscriber line 96. It is, however, to be appreciated that the API 214 may be connected to a variety of different hosts or clients which require validation of a subscriber line 96 via which the vendor 22 may carry out transactions for goods and/or services.

The vendor 22 typically communicates a request to the module 200 and forwards the subscriber line number, determined by the ANI service, to the module 200 via its API 214. The module 200 then processes the information received from the vendor 22 and provides a validation status, e.g. a associated with various statuses of the subscriber line 96 are communicated to the vendor 22 as described in more detail below.

The module 200 includes hardware and software to implement the invention. In particular, the module 200 includes a comparator module 218, a threshold database 220, an OFF-NET database 222, an ONNET database 224, a competitive local exchange carrier (CLEC) database 226, a 42 BLOCK database 228, a block and cancel database 230, an unbilled and/or unpaid bills database 232, line identification database (LIDB) short term cache 234, a validity check module 236, a regional account office (RAO) database 238, an operating company number (OCN) database 240, an ONNET database 242, an address verification database 244, customer account record exchange (CARE) results database 246, an ANI watch database 248, and an NPA (Numbering Plan Area) exchange database 250. It is to be appreciated that, in less sophisticated embodiments of the invention, all of the above databases need not be included. However, for enhanced accuracy, all of the above databases are preferably included. Further databases may also be included further to increase the reliability of the validation process.

In addition to any one or more of the above databases, the module 200 is in communication via a conventional communication channel with an offsite or, in some embodiments, on-site line identification database (LIDB) host 252. The LIDB host 252 may include a line number portability (LNP) database. Typically, the LNP database may front end access to a plurality of industry standard LIDBs (e.g. 13 different LIDBs). The LNP database may however be a separate database. As described in more detail below, the module 200 communicates the subscriber line number to the LIDB host 252 which, in turn, communicates reference subscriber data in the form of industry standard LIDB codes back to the module 200 for processing. The module 200 then processes the LIDB codes to provide the vendor 22 with validation data relating to the subscriber line 96. Unlike conventional LIDB applications which use a LIDB to make decisions regarding destination subscriber lines or call completion decisions, e.g. decisions for calling cards, collect and third party toll services or the like, the module 200 is used to identify telephone numbers of originating subscriber lines.

Broadly, the module 200 includes a communication module formed by the application program interface (API) 214 which communicates with the communication module 64 (see FIG. 5) of the vendor 22, a processor module 110 which includes the various databases 220 to 232 as well as the comparator module 218 and the validity check module 236, and an interrogation module 256 for interrogating the LIDB host 252. It is to be appreciated that the modules may be defined by one or more servers with associated databases. Further, in the example illustrated, the LIDB host 252 is shown as a single database but may comprise many different LIDB databases maintained by various LECs and, accordingly, may be located at various different geographic locations.

Referring in particular to FIGS. 16 to 19 of the drawings, various sections of a flow chart describing the method of operation of the module 200 are shown. As described above, the vendor 22 initiates a request to the module 200 to validate a transaction to be included in the account 34 associated with the subscriber line 96. As shown at step 260, the module 200 first checks to see if the BTN number is present in the request from the vendor 22 and, if no number is present, a return code 121 is generated and communicated to the vendor as shown at step 262. The code 121 indicates to the vendor 22 that the module 200 is unable to process the request. If, however, the number is present in the request from the vendor 22, the module 200 then checks if the line number captured (hereinafter also referred to as the ANI) by the ANI module 60, and the BTN entered on the form 66 (see FIG. 8) match, as shown at step 264 (see also the comparator module 218 in FIG. 15). If, however, the ANI and the BTN do not match, then the processor module 110 generates a code 120 (see step 66) to indicate that the caller and the owner of the line number are not the same person (e.g. the user enters his or her BTN in the form 66 and uses an electronic terminal connected to a different subscriber line and is thus calling from a different ANI) and the relevant modified code is then returned to the vendor 22.

If the ANI and the BTN do match, the processor module 110 interrogates the threshold database 220 (see step 268) to ascertain whether or not the line number has reached its threshold (e.g., a predefined client threshold parameter such as an account threshold). If the line number has reached its threshold, the processor module 110 then generates a code 60, as shown at step 270, which is then communicated to the vendor 22 to indicate that the line number may not be granted service. In other words, the subscriber account cannot be billed for the goods and/or services requested by the user from the vendor 22.

If the threshold has not been reached, the module 200 then interrogates its OFFNET database 22 (see step 271) to check if the industry standard NPA/NXX and operating company number (OCN) of the subscriber line 96 is present in the OFFNET database 22. The OFFNET database 22 includes NPA/NXX and OCN combinations of operating companies with which the proprietor or user of the module 200 does not have billing and collections agreements to bill into the Telco's bill page associated with the subscriber line 96. Accordingly, the facility 20 is unable to include a charge in the account associated with the subscriber line 96 on behalf of the vendor 22 for the transaction.

If the line number is in the OFFNET database 222, then the processor module 110 generates codes 130 to 133 (see step 272) and communicates these codes to the vendor 22. The codes 130 to 133 indicate that the NPA/NXX and OCN for the particular line number 96 are not billable and, accordingly, charges for goods and/or services requested by the user cannot be included in the monthly telephone account 34 by the module 200. As shown in Table 2 below, the codes 130 to 133 provide an indication to the vendor 22 why the subscriber line 96 is not billable or deliverable. If the subscriber line number is not included in the OFFNET database 222, a check is conducted to see whether or not the subscriber line number is included in the ONNET database 224. This check is however optional in the embodiment depicted in the drawings, but may be mandatory if the module 200 does not include the OFFNET database 222.

Thereafter, as shown in step 278, the processor module 110 checks to see if the line number is found in a known CLEC table in the CLEC database 226. CLEC numbers are those line numbers that are known to have ported to a CLEC and, accordingly, the proprietor of the module 200 is thus unable to route these line numbers to the correct billing entities. If the line number is found in the CLEC database 226, then the processor module 110 generates a code 140 (see step 276) which is communicated to the vendor 22. The code 140 indicates that the BTN provided by the user is not billable for the CLEC and the module 200 can thus not charge the transaction to the subscriber account associated with the subscriber line 96.

If the line number is not found in the CLEC database 226, then the module 200 checks to see if the subscriber of the subscriber line 96 has requested a 4250 billing block as shown at step 278. In particular, the processor module 110 interrogates the 42 BLOCK database 228 and, if the number is located in the database 228, which indicates that monthly recurring charges (4250) charges are prevented from being billed to that line number, the processor module 110 generates a code 150 (see step 280) which is communicated to the vendor 22 to indicate that billing to the particular subscriber line 96 has been blocked.

If, however, the subscriber line 96 has not been blocked, the module 200 then checks at step 282 if the line number is located in the block and cancel database 230 and, if so, the processor module 110 generates codes 160 and 161 which are then communicated to the vendor as shown at step 284. The block and cancel database 230 includes requests from owners of subscriber lines, agencies, businesses, or the like that a service be canceled or blocked from further billing.

Thereafter, the module 200 interrogates the unbilled and/or unpaid bills database 232, as shown at step 286, to check if there is a history of any unpaid bills and/or unbillable bills associated with the subscriber line 96. Unbillable bills relate to those subscriber line numbers where previous attempts have been made to bill charges to the subscriber account associated with the line number, and which have been returned as unbillable. If the processor module 110 locates the line number in the unbillable and/or unpaid bills database 232 then, as shown at step 288, a code 170 is generated and communicated to the vendor 22 to indicate that the line number was previously found to be unbillable and is still considered to be unbillable.

The processing described above conducts a preliminary investigation into the subscriber line number or ANI/BTN to provide an initial indication of whether or not the ANI/BTN corresponds with a billable subscriber line. Once the initial investigation has been conducted, the module 200 then uses the ANI to obtain reference subscriber line data in the form of LIDB codes from one or more industry standard databases in the form of the LIDB host or database 252. Examples of the LIDB codes used in the module 200 are shown in Table 3 below.

As shown at step 290, if the ANI is not found in the LIDB database 252, the module 200 cannot provide any validation data to the vendor 22 on this subscriber line and an appropriate code is then communicated to the vendor 22 as shown at block 292.

Figure 18:
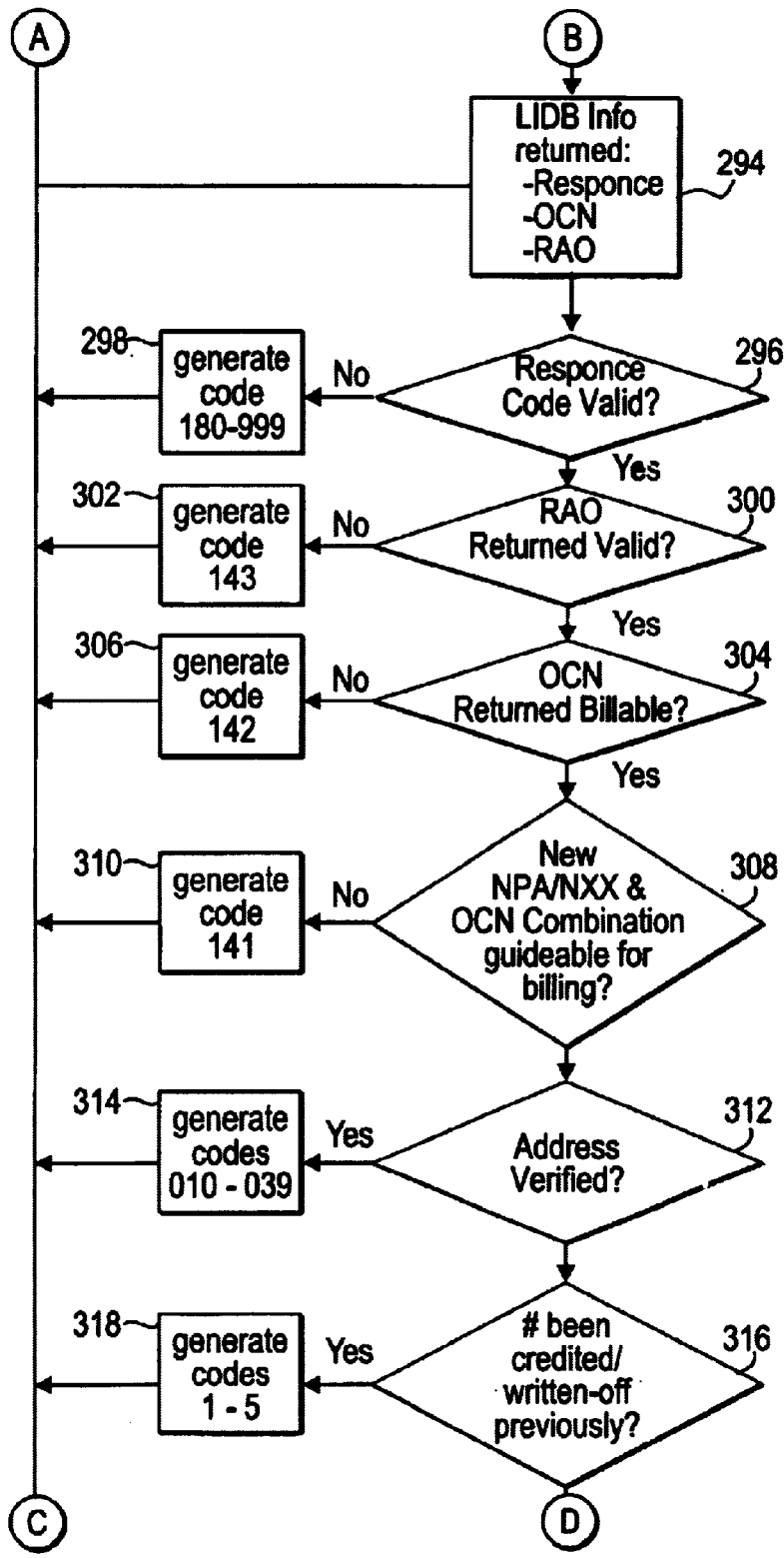

Once the LIDB database or host 252 has been interrogated, it returns industry standard LIDB codes and line number portability (LNP) data to the module 200 as shown in step 294 (see FIG. 18). The LIDB codes are then mapped or translated by the processor module 110 into modified validation codes (see Table 3) which provide relevant validation information to the vendor 22. As can be seen from Table 3, the same modified validation code can be generated from a plurality of different LIDB codes. Once the LIDB information codes have been returned to the processor module 110, the LIDB codes, including OCN and RAO response codes, are fed into the validity check module 236 (see FIG. 15) as shown at step 96.

As mentioned above, the LIDB host 252 may also provide LNP data to the module 200. The LNP data is used to identify subscriber line numbers that have ported to a CLEC. If a subscriber line has been ported to a CLEC, the billing ONNET status of the CLEC is verified in the CLEC database 226. The LNP identifies the facilities based CLECs which are CLECs that have been assigned all the line numbers for an NPA/NXX in a specific geographic territory. This type of CLEC would be in control of the cable, dial tone and billing envelope for that number. Typically, the LNP cannot be used to identify CLEC sellers which have resold the subscriber line under their brand, but still lease the cable and tone from an incumbent local exchange carrier (ILEC). Accordingly the facility 28 may be unable to process transaction data onto a bill page or telephone account 34 of the CLEC reseller bill page. In order to identify reseller CLECs, the module 200 compares RAO and OCN information, returned from the LIDB host 252, to data in the ONNET database 224. The OCN is the local Telco that owns the subscriber line number and the RAO is the office of the Telco that is responsible from a billing standpoint for the subscriber line number.

If the validity check module 236 determines that the response codes are invalid, the module 200 generates modified codes 180 to 999 (see step 298 and Table 2) which are communicated to the requester or vendor 22 to indicate that the mapping of the LIDB codes to the modified codes concluded that the line is an unbillable subscriber line.

If the validity check module 236 confirms the validity of the LIDB codes and, in the event of the line number being a billable line number, the processor module 110 then checks the RAO database 238 to ascertain whether or not the RAO is billable, as shown at step 300. If the RAO is not billable, then the processor module 110 generates and communicates a return code 143 (see step 302) to indicate to the vendor 22 that the line number belongs to a CLEC which is not billable by the module 200.

In a similar fashion, at step 304 the processor module 110 checks to see if the OCN returned from the LIDB host 252 corresponds with a known CLEC or if the OCN corresponds with an OFFNET OCN and is therefore also unbillable. If the line number corresponds to an OCN that is not billable, a return code 142 is generated by the processor module 110 and communicated to the vendor 22 (see step 306).

If the subscriber line number has passed the RAO and OCN checks and, accordingly, it appears that the number is billable, the processor module 110 then checks to see if a new NPA/NXX and OCN combination for this line number is guidable to the correct local Telco for billing (see step 308). If the line number is not guidable, then the module 200 generates a code 141 at step 310 which is communicated to the vendor 22 to indicate that, even though the line number is billable, the facility 28 is unable to guide the billing information to the new Telco for billing. Accordingly, the telephone number is in fact non-billable insofar as the facility 28 is concerned and a decline status is therefore communicated to the vendor 22.

The abovementioned steps are carried out to ascertain whether or not the subscriber line 96 can be billed for the goods and/or services requested. However, to enhance the accuracy or reliability of the module 200, further checks or verification are conducted as described below.

In the event that the subscriber line number has passed or complied with the abovementioned checks, and has thus not yet been rejected, the module 200 performs address verification procedures at step 312. The module 200 then interrogates an address verification database 244 to compare the address or location data (e.g. a ZIP code) supplied by the user via the form 66 (see FIG. 8) with reference address data as shown at step 312. If, however, the address supplied by the user does not match with the address in the verification database 244 or, the addresses are not within a predefined range or area, the processor module 110, as shown at step 314, generates codes 10 to 39 which are then communicated to the vendor 22 to indicate the level of likelihood that the caller (ANI) and the account owner are the same person.

During the address verification step 312, the module 200 interrogates a customer account record exchange (CARE) database (which can be an on-site database which is regularly updated), to provide enhanced reliability. In particular, the CARE database or information site is typically one or more industry standard offsite databases which allow consumers to select or change their long distance service provider. Local Telcos forward specific customer information to the LEC associated with the subscriber. The information communicated typically includes a new phone number, billing address, installation date, the person or organization responsible for the account, or the like.

As shown at step 316, the module 200 interrogates the CARE database or information site and CARE data is then loaded into CLEC and new line databases to perform certain fraud and billing checks. The CARE information investigation occurs after a successful validation event. Once the module 200 has validated the subscriber line 96, the subscriber line number data is sent to a CARE database provider hosting the CARE database 246 to obtain the BNA and age of the account. The information is typically returned within 48 hours and then processed. Care records that are returned without BNA and CLEC ACCOUNT codes are inserted into the CLEC database 226 for future reference. Accordingly, if the BTN is presented again at a later date, it will fail the CLEC check step (see step 274 in FIG. 17).

The ANI watch database 248, which includes historical and adjusted information, is used by the module 200 to determine if the account has previously been adjusted (see step 316). Typically, this step includes ascertaining previous requests by the subscriber for credit, obtaining data on any written off amounts for charges that were billed to a bill page, or the like.

If adjustments have previously been made to the account associated with the subscriber line 96, the processor module 110 generates codes 1 to 5 (see step 318) to indicate to the vendor 22 that the adjustments have been made. If no adjustments have been made, the processor module 110 checks to see whether or not the line number has a business line indicator as shown at step 320. If the business line indicator is active, the module 200 generates a code 70 (see step 322) which is communicated to the vendor 22 to advise that the line is a business line. Thereafter, as shown in step 324, the processor module 110 checks to see if the subscriber line number has been in service for less than about 90 days and, if so, a return code 80 (see step 326) is generated to advise the vendor 22 who may then selectively decide whether or not to conclude the transaction. A database of new numbers may be updated with the new number.

Thereafter, the module 200 interrogates the ANI watch database 248 (see step 328) to ascertain whether or not the area code of the line number has been changed or is scheduled to change. This interrogation is typically for billing purposes only and is not used to decide upon the validity of the request. In this step, the vendor 22 requesting the validation typically updates the billing file with the new area code number, and the processor module 110 generates a code 110 (see step 330) to advise the vendor 22 of the scheduled change to the area code.

Once the line number has passed all the aforementioned checks, the module 200 then concludes that the subscriber line 96 obtained using ANI techniques is in fact a billable line and, accordingly, the transaction may be charged directly to the account of the subscriber. Accordingly, the module 200 then generates a code 000 (see step 334) which is communicated to the vendor 22. The code 000 defines an approved status following both a billable line number inquiry as well as several fraud checks which are carried out by the fraud control module 332. If the line number has passed the abovementioned checks and the return code 000 is generated, the process terminates at block step 336. Thus, step 336 defines the end of the process during which the various checks have been conducted on the subscriber line 96 to assess whether or not it is a billable subscriber line that charges may be billed to. Step 338 defines the last step to which the process jumps when, at any point during the abovementioned process, the line number is found not to be billable (e.g., a creditworthy decision was requested by the vendor 22) and the inquiry is accordingly terminated and the relevant code is communicated to the vendor 22.

The abovementioned steps are typically executed in real time. However, information sources that do not allow checks on the line number in real time may be are carried out subsequently on the line number. Typically, once the real time evaluation is carried out and the return code 000 is communicated to the vendor, and the vendor 22 decide to proceed with the transaction, transaction data is then periodically returned to the module 200 by the vendor 22 for a pre-billing validation check or actual billing. During actual billing the module 200 accesses an account folder of the subscriber line at the Telco 26 and inserts the charges due to the vendor 22 into the telephone account 34. As shown at step 340, line numbers are sent to the CARE database 246 to determine if the BNA is available at the local Telco 26. If the folder or telephone account 34 is not available, the local Telco 26 typically sends the BNA and codes as to why the number is unavailable to the facility 28. If the BNA is found in the CARE database 246, the processor module 110 then checks to see whether or not the account was created within the last 90 days as shown at step 342. If the account was not created within the last 90 days, then the business indicator is checked as shown at step 344 and the process ends as previously shown at step 346. If, however, the number was found in the CARE database 246, the account was created within the last 90 days, or has an active business indicator then the module 200 generates the appropriate codes which are communicated to vendor 22 and the process terminates as shown at step 348.

The above process has been described in terms of modified codes set out in Table 2 but, it is to be appreciated, that the mapping or translation of the LIDB codes may produce any other defined set of corresponding codes so long as the codes are mapped onto, or generated in response to, any one or more of the industry standard LIDB codes.

A summary of the codes generated by the module 200 during execution of the validation process is provided in Table 1 below.

TABLE 1

Modified codes generated during the BTN Validation Process.

| Code Generated and ref to flow charts | Description of code |
| --- | --- |
| Return Code 121 | Indicates inability to proceed with validation; returned to requestor |
| See step 264 | Checks if ANI captured and BTN provided match (not required in all scenarios) |
| Return Code 120 | Indicates caller and # (line number) owner are not the same person; returned to requestor |
| See step 268 | A defined Threshold limits the number of attempts on that # within a certain timeframe |
| Return Code 60 | Indicates # may not be granted service; returned to requestor. |
| See step 271 | Checks the NPA/NXX and OCN to those in the OFFNET. OFFNET = NPA/NXX and OCN combinations where proprietor of the module 200 does not have a Billing and Collections agreement to bill into the Telco's' bill page. |
| Return Code 130–133 | Indicates that NPA/NXX & OCN for that Number are not billable; returned to requestor |
| See step 274 | Checks the line number to see if found in known CLEC table. These are numbers that are known to have ported to a CLEC. Proprietor is unable to route these # to the correct billing entities. |
| Return code 140 | Indicates # not billable for CLEC; returned to requestor. |
| See step 278 | Checks line # to see if owner has requested a 4250 Billing block. This block prevents monthly recurring (4250) charges from being billed to that line #. |
| Return Code 150 | Indicates that requested a block of billing; returned to requestor. |
| See step 282 | Checks line number for inclusion in the Block and Cancel database. This database includes requests from line # owners, agencies, businesses etc that have requested that service be cancelled and or blocked from further billing. |
| Return Code 160–161 | Indicates number found in Block and Cancel and is not billable; returned to requestor. |
| See step 286 | Checks line # for unbillable history. Unbillables are #s where tried to bill charges previously and have been returned as unbillable. |
| Return Code 960 | Indicates # has unbilled before and is still considered unbillable; returned to requestor. |
| See step 290 | If # not found in Unbillable, then routed to LIDB for info. |

| ITEM | Description |
| --- | --- |
| See step 294 | Identifies info returned from LIDB re. that line #; Response Code = status about that # as a call termination point. OCN = Operating Company # = the local Telco that owns that #. RAO = Regional Accounting Office = the office of the Telco that is responsible from a $ flow standpoint for that #. |
| See step 296 | Checks the validity of the LIDB code returned for the number as a Billable #. This is where the mapping of the LIDB codes to the proprietor validation codes happens. |
| Return Code 180–999 | Indicates the mappings of the LIDB codes to the proprietor Val reply codes. Each of these indicate a non-billable #; returned to requestor. |
| See step 300 | Checks if RAO returned is an RAO that is not billable. |
| Return Code 143 | Indicates that the # belongs to a CLEC and is unbillable; returned to requestor. |
| See step 304 | Checks if OCN returned from LIDB is a known CLEC or OFFNET OCN and therefore unbillable. |
| Return code 142 | Indicates that the new OCN is not billable; returned to requestor. |
| See step 308 | Checks to see if new NPA/NXX & OCN combination for # is guidable to the correct local Telco for billing. |

TABLE 1-continued

Modified codes generated during the BTN Validation Process.

| | |
|---|---|
| Return code 141 | Indicates that even though the # is billable, eBillit is unable to guide to the new Telco for billing; unguidable = unbillable; # returned to requestor. |
| The steps to indicate if # is billable have been completed. The next steps provide additional information about the # for the requestor e.g. to decide if and how much credit to extend for services. They also provide additional billing information. | |
| See step 312 | Provides address verification (if required). Matches # to address to determine likelihood of person dialing to the person that owns the acct at local Telco. |
| Return Code 10–39 | Indicates the level likelihood that the caller (ANI) and acct owner are the same. Returned to requestor. |
| See step 316 | Checks to see if # has had adjustment activity previously. This includes request for credit, written off for charges that billed to a bill page. Requestor makes credit decision based on #s history of credits, adjustments, write offs. |
| Return Code 1–5 | Indicates the type and source of adjustment to charges to that #. Returned to requestor. |
| See step 320 | Checks to see if the # has a business line indicator. Requestor decides if would like to extend service or not. |
| Return Code 70 | Indicates that the # is identified as a business. |
| See step 324 | Checks to see if the # has been in service less than 90 days. Requestor makes a decision about how much service to offer # without much payment history. |
| Return Code 80 | Indicates that the # has been in service less than 90 days. |
| See step 328 | Checks if the Area Code of the # has been scheduled to change. This is for billing information purposes only. Requestor updates billing filed with new number. |
| Return Code 110 | Indicates Area Code has been scheduled to change. New number is appended to end of record. |
| See step 334 | If the number passes all the previous checks, then 000 code is returned to requestor. The Validation is complete for this request. |
| See step 338 | End of validation for numbers that did no pass or were found in other checks. |
| END OF REAL TIME VALIDATION EVENT | |
| Information sources that do not allow checks on the # in Real-time (r-t), happen on # that was returned as 000 after the r-t validation event has completed. The #s are loaded into the appropriate databases. This information will be provided once the # is returned for billing. | |
| Steps 340, 342, 344 | Indicates path for those #s returned with a 000 code. |
| See step 340 | #s are sent to CARE source to determine if BNA (billing Name and Address) available at local Telco. Telco sends BNA and codes as to why unavailable. |
| CLEC | #s that are returned with codes that indicate the # has moved to a CLEC from the local Telco are loaded into the CLEC table. |
| See step 342 | #s are sent to the CARE source to determine if the account has been crested within the last 90 days. The response codes indicate this condition. |
| New within 90 | #s that are returned with codes that indicate this condition are loaded into the NEW table. |
| See step 344 | #s are sent to a Business source. This source identifies which numbers belong to businesses. |
| Biz table | Numbers that are indicated as being line #s that belong to businesses are loaded in this table. |

Table 2 below provides the various actions which are executed in response to a modified validity code. The table provides a description and explanation of each code. Return codes 001 to 969 relate to failure codes which are generated by the module 200 prior to investigation of the LIDB host 252. Return codes 180 to 451 are generated during the LIDB code checks. In the event of the subscriber line 96 failing the checks carried out on it, the module 200 provides optional use of a credit card and, accordingly, Table 2 sets out codes which the module 200 generates in response to executing a standard credit card enquiry for a particular transaction. If the module 200, which is typically defined by a server and associated databases, is down, codes 994 to 999 are generated and communicated to the vendor.

TABLE 2

Validation & BNA Reply Codes

| Code | Action | Description | Explanation |
|---|---|---|---|
| | | BILLABLE CODES | |
| 000 | Approved | Billable; was not found during fraud control checks | Passed all billing and fraud control checks |
| | | FRAUD CONTROL CODES (performed after billable check) | |
| | | ANI WATCH (adjustments to bill) | |
| 001 | Verify | Billable; found in ANI WATCH - CLIENT source all | Passed all billable checks; but ANI had been adjusted previously at vendor's, Client's or telco's request for your Client # |
| 002 | Verify | Billable; ANI WATCH - CLIENT source Client | Passed all billable checks; but ANI had been adjusted previously at Client's request for your Client # |
| 003 | Verify | Billable; ANI WATCH - CLIENT source Telco or Vendor | Passed all billable checks; but ANI had been adjusted previously at vendor's or telco's request for your Client # |
| 004 | Verify | Billable; found in ANI WATCH - GLOBAL | Passed all billable checks; ANI had been adjusted previously at vendor's, Client's or telco's request for all Client ids |
| 005 | Verify | Billable; found in ANI WATCH - PRODUCT | Passed all billable checks; ANI had been adjusted previously at vendor's, Client's or telco's request for same product type |
| | | ZIP VERIFICATION | |
| 010 | Verify | Billable; Unable to match ZIP invalid | Passed all billable checks; unable to find this Zip code for this NPA/NXX - |
| 011 | Verify | Billable; ZIP does not match | Passed all billable checks; Zip code does not match this NPA/NXX |
| 012 | Verify | Billable; ZIP matches to same Metropolitan area | Passed all billable checks; Zip code matches to same Metropolitan area as NPA NXX. |
| | | ADDRESS VERIFICATION | |
| | | Note: The result of an AVS check does not mean that the transaction is declined. This information is advice only. The system compares the AVS data with billing information for the buyer and passes the results of the comparison to the merchant. | |
| 020 | Verify | Billable; BNA match not found | Passed all billable checks; no BNA match found for ANI |
| 021 | Verify | Billable; Unable to verify BNA invalid | Passed all billable checks; unable to verify BNA to ANI info sent |
| 022 | Verify | Billable; with zip-Match, plus4-Match, locale-Match | Passed all billable checks; BNA Zip code + 4 & locale (street address) matches info sent for ANI, Name does not match |
| 023 | Verify | Billable; with zip-Match, plus4-Match, NoMatch-locale. | Passed all billable checks; BNA Zip code + 4 matches info sent for ANI but locale (street address) does not match |
| 024 | Verify | Billable; zip-Match, NoMatch-plus4, locale-Match. | Passed all billable checks; BNA Zip code & locale (street address) matches info sent for ANI but + 4 does not match |
| 025 | Verify | Billable; zip-Match, NoMatch-plus4, NoMatch-locale. | Passed all billable checks; BNA Zip code matches info sent for ANI but locale (street address) & + 4 does not match |
| 026 | Verify | Billable; NoMatch-zip, plus4-Match, locale-Match. | Passed all billable checks; BNA +4 and locale (street address) matches info sent for ANI but Zip does not match |
| 027 | Verify | Billable; NoMatch-zip, plus4-Match, NoMatch-locale. | Passed all billable checks; BNA +4 matches info sent for ANI but locale (street address) and Zip does not match |
| 028 | Verify | Billable; NoMatch-zip, NoMatch-plus4, locale-Match. | Passed all billable checks; BNA locale (street address) matches info sent for ANI but ZIP and +4 does not match |
| 029 | Verify | Billable; NoMatch-zip, NoMatch-plus4, NoMatch-locale. | Passed all billable checks; BNA does not match zip, + 4 or locale (street address) sent for ANI |
| 030 | Good | Address & Zip Match | |
| 031 | Verify | Address Match, Zip No Match | |
| 032 | Verify | Address Match, Zip Service Unavailable | |
| 033 | Verify | Address No Match, Zip Match | |
| 034 | Verify | Address No Match, Zip No Match | |
| 035 | Verify | Address No Match, Zip Service Unavailable | |
| 036 | Verify | Address Service Unavailable, Zip Match | |

TABLE 2-continued

Validation & BNA Reply Codes

| Code | Action | Description | Explanation |
|---|---|---|---|
| 037 | Verify | Address Service Unavailable, Zip No Match | |
| 038 | Verify | Address Service Unavailable, Zip Service Unavailable | |

AREA CODE CHANGE INDICATOR

| Code | Action | Description | Explanation |
|---|---|---|---|
| 110 | Update | Indicates there has been an area code change for this NPA/NXX | Code is sent in addition to the validation response codes. New phone number is appended to record. Provided to update the account with the correct BTN. |

MISC

| Code | Action | Description | Explanation |
|---|---|---|---|
| 120 | Verify | BTN and AMI do not match | For use where BTN and ANI are passed and do not match. |
| 121 | Verify | BTN or ANI are missing from record | For use where BTN and ANI is missing from record |

UNBILLABLE CODES

OFFNET

| Code | Action | Description | Explanation |
|---|---|---|---|
| 130 | Unbillable | NPA/NXX found in OFFNET - GLOBAL | Area code/exchange (NPA/Nxx) combination resides in OFFNET DB. OFFNET is a territory where the LEC (Local Exchange Carrier) is unable to provide 3rd party presentation in to it's envelope. |
| 131 | Unbillable | NPA/NXX found in OFFNET - CLIENT SPECIFIC | Area code/exchange (NPA/Nxx) combination resides in OFFNET DB specific for this Client id. |
| 132 | Unbillable | NPA/NXX found in OFFNET - PRODUCT | Area code/exchange (NPA/Nxx) combination resides in OFFNET DB specific for this product type. |
| 133 | Unbillable | NPA/NXX NOT VALID | Area code/exchange is not a valid area code exchange |

CLEC (CLECs are unable to provide 3rd party bill presentation in their envelopes.)

| Code | Action | Description | Explanation |
|---|---|---|---|
| 140 | Unbillable | Line number (NPA/Nxx-xxxx) in CLEC Territory | BTN has been ported to a CLEC (competitive local exchange carrier). |
| 141 | Unbillable | NPA/Nxx not ON NET | BTN has been ported to a CLEC (competitive local exchange carrier) and is not billable. |
| 142 | Unbillable | Line number OCN in CLEC OCN table | Operating Company number for this BTN was found on CLEC OCN table. The number is not billable. |
| 143 | Unbillable | Line number RAO in CLEC RAO table | Regional Accounting Office number for this BTN was found on CLEC RAO table. This BTN is not billable. |

42 BLOCK (4250s Only)

| Code | Action | Description | Explanation |
|---|---|---|---|
| 150 | Unbillable | Line Number has a block for 4250 records | Consumer has requested a block for all MRCs (monthly recurring charges) from being billed to this phone number. |

BLOCK & CANCEL

| Code | Action | Description | Explanation |
|---|---|---|---|
| 160 | Unbillable | GLOBAL — Line number has been blocked to stop all charges. | Consumer requested block to stop all charges from being billed to this number. |
| 161 | Unbillable | CLIENT — Line number has a block to stop all charges from this Client id. | Consumer requested a block to stop charges from being billed or to cancel service for this phone number from this Client id. |

UNBILLS

| Code | Action | Description | Explanation |
|---|---|---|---|
| 960 | Unbillable | Line number is Unbillable. | Line number has been returned from the Local Telephone companies within th last 6 months as unable to be billed. |

LIDB FAILURE

| Code | Action | Description | Explanation |
|---|---|---|---|
| 180 | Unbillable | Line number failed LIDB check - GENERAL | Line Number has been returned from LIDB as unbillable. |
| 181 | Unbillable | Vacant NPA NXX | No working line #s in NPA NXX |
| 182 | Unbillable | No Incoming Calls | Line # cannot accept incoming calls |
| 183 | Unbillable | Denied ANI | Auto decline of all attempts from this ANI |
| 184 | Unbillable | Calling Card block | Auto decline of Calling Card number |
| 185 | Unbillable | Collect Call Block | Auto decline of Collect calls to this number |
| 186 | Unbillable | Third Party Call Block | Auto decline all Third Party billed calls to this number |

TABLE 2-continued

Validation & BNA Reply Codes

| Code | Action | Description | Explanation |
|---|---|---|---|
| 187 | Unbillable | Credit Card Block | Auto decline of charges billed to Credit Card |
| 188 | Unbillable | Group Number Block | Auto decline of attempts from this group. |
| 189 | Unbillable | Audiotext Bock | Number does not allow audiotext calls. |
| 190 | Unbillable | Excessive Calling Card PIN hits | Threshold for calling card attempts has been exceeded. |
| 191 | Unbillable | Line Number Block | Auto decline of all charges to this number |
| 200 | Unbillable | Excessive Use - BTN | BTN has exceeded threshold |
| 201 | Unbillable | Excessive Use DN | DN has exceeded threshold |
| 202 | Unbillable | Excessive Use - ANI | ANI has exceeded threshold |
| 203 | Unbillable | Excessive USE - Calling Card Pin | Calling Card Pin has exceeded threshold |
| 220 | Unbillable | Feature Group A | Local telephone switch is Feature Group A |
| 221 | Unbillable | PBX line | Line # is a PBX line |
| 222 | Unbillable | WATS line | Line # is a WATS line |
| 223 | Unbillable | Hotel/Motel Auto Quote w/ tax | Hotel/Motel Auto Quote w/ tax |
| 224 | Unbillable | Hotel/Motel Auto quote w/o tax | Hotel/Motel Auto quote w/o tax |
| 225 | Unbillable | Dormitory line | Line # belongs to a dorm |
| 226 | Unbillable | Hospital line | Line number belongs to a hospital |
| 227 | Unbillable | Centrex line | Line number belongs to CENTREX |
| 228 | Unbillable | Alternate Service Provider | Line # belongs to an alternate service provider |
| 229 | Unbillable | POTS line (collect or third party calls) | Line # is plain old telephone service lines for business or residential |
| 230 | Unbillable | Pager # | Line number belongs to pager |
| 231 | Unbillable | PCS/Mobile/Cellular # | Line number belongs to a wireless provider |
| 240 | Unbillable | Line was disconnected w/o referral | Line # was disconnected w/o a referral number |
| 241 | Unbillable | Line Number changing | Line is not connected yet. |
| 242 | Unbillable | not used | |
| 243 | Unbillable | DISCO w/o referral | Line number has been removed from service w/o referral |
| 244 | Unbillable | Temp DISCO | Line number has been removed from service temporarily |
| 245 | Unbillable | DISCO with referral | Line number has been disconnected w/ referral or Operator takes calls |
| 246 | Unbillable | Temp DISCO w/ referral | Line number has been removed from service temporarily w/ referral |
| 250 | Unbillable | POTS line rating on rate plan | POTS line is on a rate plan for business or residential message rate 1 or 2 or flat rate |
| 300 | Unbillable | Public - Incompatible interface | Public phone with incompatible interface |
| 301 | Unbillable | LEC Public Standard PreP OT | LEC Public phone standard interface; prepay overtime |
| 302 | Unbillable | LEC Public Alternate | LEC Public phone alternate interface; functions controlled by set |
| 303 | Unbillable | LEC Public Standard PP OT | LEC Public phone standard interface; postpay overtime |
| 304 | Unbillable | IC Public | IC Public Phone - Alternate Interface |
| 305 | Unbillable | IC Public Standard | IC Public Phone - Standard Interface |
| 306 | Unbillable | LEC Public Special - PP OT | LEC Public Phone - Special billing post paid OT |
| 307 | Unbillable | LEC Public Special - PreP OT | LEC Public Phone - Special Billing; Pre pay OT |
| 308 | Unbillable | LEC Semi Public | LEC Semi Public Phone |
| 309 | Unbillable | LEC Semi Public Phone (no collect or 3rd Party calls) | LEC Semi Public Phone does not allow collect or 3rd party calls to this number |
| 310 | Unbillable | LEC Prepaid Card | LEC Prepaid Card Telecommunications station |
| 311 | Unbillable | IPP (fka COCOT) Standard interface | Payphone Standard |
| 312 | Unbillable | IPP (fka COCOT) Alternate interface | Payphone - Alternate |
| 313 | Unbillable | Coinless (non IPP fka COCOT) | Coinless Pay phone |
| 314 | Unbillable | Coinless (IPP fka COCOT) | Coinless payphone |
| 315 | Unbillable | Prison (non IPP fka COCOT) | Prison payphone |
| 316 | Unbillable | Prison (IPP fka COCOT) | Prison Payphone |
| 450 | Unbillable | BNS: Voice Quote - without tax | Charge quotes without tax |
| 451 | Unbillable | BNS: Voice Quote - with tax | Charge quotes with tax |
| CREDIT CARD RESPONSE CODES ||||
| 000 | Approved | Credit card approved | |
| 501 | Decline/Error | User authentication Failed | |
| 502 | Decline/Error | Invalid tender | Your merchant bank account does not support the following credit card type that was submitted |

TABLE 2-continued

Validation & BNA Reply Codes

| Code | Action | Description | Explanation |
| --- | --- | --- | --- |
| 503 | Decline/Error | Invalid transaction type | Transaction type is not appropriate for this trans-action. For example, you cannot credit an authorization-only transaction. |
| 504 | Decline/Error | Invalid amount | |
| 505 | Decline/Error | Invalid merchant information | Processor does not recognize your merchant account information. Contact your bank account acquirer to resolve this problem. |
| 512 | Decline/Error | Declined | Please check the credit card number and transaction information to make sure they were entered correctly. If this does not resolve the problem, have the customer call the credit card issuer to resolve. |
| 513 | Decline/Error | Referral | Transaction was declined but could be approved with a verbal authorization from the bank that issued the card. Submit a manual Voice Authorization transaction and enter the verbal auth code |
| 519 | Decline/Error | Original transaction ID not found | The transaction ID you entered for this transaction is not valid. |
| 520 | Decline/Error | Cannot find the customer reference number | |
| 522 | Decline/Error | Invalid ABA number | |
| 523 | Decline/Error | Invalid account number | Please check credit card number and re-submit. |
| 530 | Decline/Error | Account Lookup information Mismatch | Account provided found in system, however, unique key provided does not match unique key in system. |
| 531 | Decline/Error | Account does not exist | Account provided not found in system |
| 1102 | Decline/Error | Invalid expiration date | Please check and re-submit |
| 525 | Decline/Error | Transaction type not mapped to this host | |
| 526 | Decline/Error | Invalid vendor account | |
| 527 | Decline/Error | Insufficient partner permissions | |
| 528 | Decline/Error | Insufficient user permissions | |
| 550 | Decline/Error | Insufficient funds available | |
| 551 | Decline/Error | Invalid transaction returned from host | |
| 552 | Decline/Error | Processor not available | |
| 553 | Decline/Error | Credit error | Please make sure you have not already credited this transaction, or that this transaction ID is for a creditable transaction. (For example, you cannot credit an authorization.) |
| 5110 | Decline/Error | Void error | Please make sure the transaction ID entered has not already been voided. If not, then look at the Transaction Detail screen for this transaction to see if it has settled. (The Batch field will be set to a number greater than zero if the transaction has been settled). If the transaction has already settled, your only recourse is a reversal (credit a payment or submit a payment for a credit). |
| 555 | Decline/Error | Capture error | Only authorization transactions can be captured |
| 556 | Decline/Error | Failed AVS check | Address and Zip code do not match |
| 557 | Decline/Error | Cannot exceed sales cap | For ACH transactions only |
| 558 | Decline/Error | CVV2 Mismatch | |
| 800 | Unbillable | LNP Only Look-Up, number was found | LNP Only Look-Up, number was found in the LNP GTT database as ported. |
| 801 | Unbillable | LNP Only Look-Up, number was not found | LNP Only Look-Up, number was not found in the LNP GTT database, not ported. |
| 802 | Unbillable | LNP Only Look-Up, the NPANXX is not a portable range. | LNP Only Look-Up, the NPANXX is not a portable range. |
| SYSTEM DOWN | | | |
| 994 | Resubmit | Message Format Error | Message received in invalid or unrecognized format. |
| 995 | Resubmit | Time out | Session timed out. |
| 996 | Resubmit | Connection Failure | Unable to connect. |
| 997 | Resubmit | Subsystem Failure | Subsystem, such as LIDB, Credit Card, etc, not available. |
| 998 | Resubmit | Network Failure | Network Not Available |
| 999 | Resubmit | System Down | System Unavailable |

As mentioned above, the module 200 translates the LIDB codes into modified verification codes as shown in Table 2. These modified validity codes are then mapped or translated.

Table 3 below provides a list of the modified validity codes which are generated following the mapping carried out by the processor module 110 to translate LIDB codes to the modified verification codes set out in Table 1.

TABLE 3

LIDB/LNP SOURCE TRANSLATIONS for ISP:

| Resp. Type In | Resp. Code In | ACTION | LIDB ADMIN? | Description | rtfc type | EBI Code Out |
|---|---|---|---|---|---|---|
| APP | 000 | Approved | | Calling card has an Unrestricted PIN. | G1 | 000 |
| APP | 001 | Approved | | Calling card has a Restricted PIN. The switch must verify that the DNI matches the first 10 digits of the calling card before placing the call. | g1 | 000 |
| APP | 004 | Approved | | Collect call - No verification is required. | G1 | 000 |
| APP | 005 | Approved | | Third-party call - No verification is required. | G1 | 000 |
| APP | 006 | Approved | | There is a system error. | S | 999 |
| APP | 008 | Approved | | Communications Link Tests "Good." | S | 999 |
| APP | 010 | Approved | | Commercial credit card is approved and the zip code matches, if the zip code was sent. | G1 | 000 |
| APP | 011 | Approved | Y | Bill-to number has an Admin. Override to automatically approve the transaction. (Admin. Reply) | G1 | 000 |
| APP | 012 | Approved | | Originating number (ANI) has an Admin. Override to automatically approve the transaction. (Admin. Reply) | G1 | 000 |
| APP | 013 | Approved | | Dialed number (DNI) has an Admn Override to automatically approve the transaction. (Admin. Reply) | G1 | 000 |
| APP | 014 | Approved | | Group number has an Admin. Override to automatically approve the transaction. (Admin. Reply) | G1 | 000 |
| APP | 015 | Approved | | Commercial credit card is approved but the zip code check is unavailable. | CC | 500 |
| APP | 016 | Approved | | Commercial credit card is approved but the zip code check is unavailable. Retry later. | CC | 501 |
| APP | 096 | Approved | | Commercial credit card is approved but the zip code check is not supported. | CC | 502 |
| APP | 018 | Approved | | Commercial credit card is approved and the address matches but the zip code does not match. | CC | 503 |
| APP | 019 | Approved | | Commercial credit card is approved and the address and the zip code match. | CC | 504 |
| APP | 020 | Success | | LNP Only Look-Up, number was found in the LNP GTT database as ported. | LNP | 800 |
| APP | 021 | Success | | LNP Only Look-Up, number was not found in the LNP GTT database, not ported. | LNP | 801 |
| CON | 050 | Verify | | Collect call number has no block. Verify acceptance of the charge. | o1 | 000 |
| CON | 051 | Verify | | Third-party call number has no block. Verify acceptance of the charge. | O1 | 000 |
| CON | 053 | Denied | | Unable to authorize, Automatic Code Gapping is in effect at the LIDB. Every third query is dropped by the LIDB. | S | 999 |
| CON | 0110 | Denied | Y | Excessive Use - The bill-to number exceeded the high limit threshold in the Admin. fraud control system. (Admin. Reply) | G3 | 000 |
| CON | 055 | Denied | Y | Excessive Bad PIN Attempts - The threshold for bad PIN attempts for the calling card was exceeded in the Admin. fraud control system. (Admin. Reply) This is the same as reply code 309. | O2 | 000 |
| CON | 060 | Conditional | Y | Low Limit Warning - The bill-to number exceeded the low limit threshold in the Admin. Fraud control system. (Admin. Reply) | G3 | 000 |
| CON | 061 | Conditional | Y | Low Limit Warning - The dialed number exceeded the low limit threshold in the Admin. fraud control system. (Admin. Reply) | G3 | 000 |
| CON | 062 | Denied | Y | Excessive Use Dialed - The dialed number exceeded the high limit threshold in the Admin. fraud control system. (Admin. Reply) | G3 | 000 |
| CON | 063 | Conditional | Y | No Host Still Billable - There is no LIDB check available, but the Customer has a billing agreement with this LEC. (Admin. Reply) | G2 | 180 |
| CON | 064 | Approved | Y | Commercial credit card is approved but the zip code and the address do not match. | CC | 505 |
| CON | 065 | Conditional | Y | Low Limit Warning - The ANI exceeded the low limit threshold in the Admin. fraud control system. (Admin. Reply) | G3 | 000 |
| CON | 066 | Denied | Y | Excessive Use ANI - The ANI exceeded the high threshold in the Admin. fraud control system. (Admin. Reply) | G3 | 000 |

TABLE 3-continued

LIDB/LNP SOURCE TRANSLATIONS for ISP:

| Resp. Type In | Resp. Code In | ACTION | LIDB ADMIN ? | Description | rtfc type | EBI Code Out |
|---|---|---|---|---|---|---|
| CON | 070 | Approved | | Calling card has no service denial in the Card Service Denial Indicator field. Calling card calls may be billed to this card number. | G1 | 000 |
| CON | 071 | Approved | | Calling card has no service denial in the Pin Service Denial Indicator field. Calling card calls may be billed to this card number. | G1 | 000 |
| CON | 080 | Verify | | Collect calls - Accept intralata, Reject interlata collect calls. Recommend verify acceptance of the charge. | O1 | 000 |
| CON | 081 | Verify | | Third-party calls - Accept intralata, reject interlata third-party calls. Recommend verify acceptance of the charge. | O1 | 000 |
| CON | 082 | Verify | | Collect calls - Accept intralata, verify interlata collect calls. Recommend verify acceptance of the charge. | O1 | 000 |
| CON | 083 | Verify | | Third-party calls - Verify intralata, reject interlata third-party calls. Recommend Verify acceptance of the charge. | O1 | 000 |
| CON | 084 | Verify | | Collect call - Verify acceptance of the charge by an Operator. | O1 | 000 |
| CON | 085 | Verify | | Third-party call - Verify acceptance of the charge by an Operator. | O1 | 000 |
| CON | 086 | Verify | | Collect call - Accept intralata charge, verify interlata charge with Operator. | O1 | 000 |
| CON | 087 | Verify | | Third-party calls - Verify intralata charge with operator, reject interlata charge with Operator. | O1 | 000 |
| CON | 088 | Verify | | Collect Calls: POTS Line (Business/Residential) | G5 | 000 |
| CON | 089 | Verify | | Third-Party Calls: POTS Line (Business/Residential) | G5 | 000 |
| CON | 090 | Verify | | BNS: Centrex Line, Collect calls - Some LECs allow billing to this type of line, others do not. Verify Acceptance. | G4 | 000 |
| CON | 091 | Verify | | BNS: POTS Line - Residential - Message rate 1 | G9 | 000 |
| CON | 092 | Verify | | BNS: POTS Line - Residential - Message rate 2 | G9 | 000 |
| CON | 093 | Verify | | BNS: POTS Line - Business - flat rate | G9 | 000 |
| CON | 094 | Verify | | BNS: POTs Line - Business - message rate 1 | G9 | 000 |
| CON | 095 | Verify | | BNS: POTS Line - Business - message rate 2 | G9 | 000 |
| CON | 096 | Verify | | BNS: POTS Line - Residential - flat rate | G9 | 000 |
| DENY | 100 | Denied | | Message Format Error Message | S | 994 |
| DENY | 100 | Denied | | Message Format Error - Date format | S | 994 |
| DENY | 100 | Denied | | Message Format Error - Header Message Error | S | 994 |
| DENY | 100 | Denied | | Message Format Error - Merchant ID Error | S | 994 |
| DENY | 100 | Denied | | Message Format Error - No End of Header Indicator | S | 994 |
| DENY | 100 | Denied | | Message Format Error - Header Data Indicator, did not contain data in each field of the message That was represented by the message text map field | S | 994 |
| DENY | 100 | Denied | | Message Format Error - PIN not numeric | S | 994 |
| DENY | 100 | Denied | | Message Format Error - Terminating Error (commercial credit card only | S | 994 |
| DENY | 100 | Denied | | Message Format Error - Terminating Number not numeric | S | 994 |
| DENY | 100 | Denied | | Message Format Error - Originating Number not Numeric | S | 994 |
| DENY | 100 | Denied | | Message Format Error - Charge Number not Numeric | S | 994 |
| DENY | 100 | Denied | | Message Format Error - No End Header Indicator | S | 994 |
| DENY | 101 | Denied | | Message Format Error Invalid Customer/Terminal ID Number | S | 994 |
| DENY | 102 | Denied | | Message Format Error Invalid Message Type | S | 994 |
| DENY | 103 | Denied | | Message Format Error Invalid Transaction Type | S | 994 |
| DENY | 104 | Denied | | Message Format Error Invalid Sequence Number | S | 994 |
| DENY | 105 | Denied | | Message Format Error Invalid Data Indicator | S | 994 |
| DENY | 105 | Denied | | Message Format Error - Header Data Indicator | S | 994 |
| DENY | 107 | Denied | | Bad PIN format. PINs must be equal to or higher than 2000. | S | 994 |
| DENY | 200 | Denied | | Calling card blocked, missing customer record - There is no record of that calling card number in the database. | S | 994 |
| DENY | 201 | Denied | | BNS, missing customer record - There is no record of that line number in the database. | S | 994 |
| DENY | 202 | Denied | | Missing BNG - There is no record of that NPANXX in the database. | S | 994 |
| DENY | 203 | Denied | | Non billable NXX - DPC table failure. The NPANXX does not have routing or allow billing, e.g. cellular. (LIDB or Admin. Reply) | G2 | 180 |
| DENY | 204 | Denied | | Calling card blocked, screened data - A screening mechanism is in place at the LIDB that does not allow charges to this calling card. | O2 | 000 |

TABLE 3-continued

LIDB/LNP SOURCE TRANSLATIONS for ISP:

| Resp. Type In | Resp. Code In | ACTION | LIDB ADMIN ? | Description | rtfc type | EBI Code Out |
|---|---|---|---|---|---|---|
| DENY | 205 | Denied | | Protocol converter problem - There is a problem with the SS7 protocol converter. | S | 999 |
| DENY | 206 | Denied | | BNS & No Calling Card Calls - No Host, Nonparticipating Group. This NPANXX exists but there is no LIDB host. (LIDB or Admin. Reply) | o2 | 180 |
| DENY | 207 | Denied | | LIDB Access Denied because no queries should be sent to this LIDB destination. (Admin. Reply) | S | 999 |
| DENY | 208 | Denied | | Calling card blocked, Screened Data on PIN (Pin Service Denial Indicator) - A screening mechanism is in place at the LIDB that does not allow charges to this PIN. | O2 | 000 |
| DENY | 209 | Denied | | External SS7 Problem - There is a format problem in the SS7 network | S | 999 |
| DENY | 210 | Denied | | Calling card blocked, screened data - A screening mechanism is in place at the LIDB that does not allow charges to this calling card. | O2 | 000 |
| DENY | 211 | Denied | | Calling card is blocked because it has a bad PIN or the PIN does not match database information. | O2 | 000 |
| DENY | 211 | Denied | | Unexpected Data Value, Calling card blocked, Bad PIN - This means a bad PIN was used or there is no PIN on file. | O2 | 000 |
| DENY | 212 | Denied | | Calling card blocked, PIN Excessive Use at LIDB Owner. - The PIN exceeded the high threshold in the LIDB fraud control system | G3 | 000 |
| DENY | 213 | Denied | | Vacant BNG - There are no working lines in the NPANXX. | G2 | 181 |
| DENY | 214 | Denied | | No Collect calls - Collect calls are not allowed to this line number. | O2 | 000 |
| DENY | 215 | Denied | | No Third-party calls - Third-party calls are not allowed to this line number | O2 | 000 |
| DENY | 216 | Denied | | BNS: LEC Public - Standard Interface (functions controlled by the network) - Postpay Overtime | G10 | 303 |
| DENY | 296 | Denied | | BNS: Coinless (non IPP fka COCOT) | G10 | 313 |
| DENY | 218 | Denied | | BNS: semi-public phone - No Collect or Third-party calls are allowed to this line number. | G10 | 309 |
| DENY | 219 | Denied | | Spare - This LIDB response is not in use at this time. | AV | 180 |
| DENY | 220 | Denied | | Time-out, No response from Host - A response was not received from the host database within 4 seconds for a Telco query or 12 seconds for a Bank card query. (LIDB or Admin. Reply) | S | 180 |
| DENY | 221 | Denied | | BNS Data unavailable, Error Message, No Host - No collect or third-party calls should be allowed to this line number. | S | 180 |
| DENY | 222 | Denied | | Calling card Data unavailable, Error Message, No Host - No calling card calls should be allowed to this line number. | S | 180 |
| DENY | 223 | Denied | | BNS & Calling card, screened response LIDB - A screening mechanism is in place at the LIDB that does not allow charges to this account number. | O2 | 000 |
| DENY | 224 | Denied | | LIDB Misroute - The query was routed to the wrong LIDB. | S | 999 |
| DENY | 225 | Denied | | Reject, Reroute - The LIDB could not read the format of the query. | S | 994 |
| DENY | 226 | Denied | | Unexpected Component - The LIDB cannot interpret the format of the query. | S | 994 |
| DENY | 227 | Denied | | UDTS, SS7 Network problem - There is an SS7 network problem. | S | 999 |
| DENY | 228 | Denied | | BNS: Personal Communication Service (PCS) | G8 | 231 |
| DENY | 229 | Denied | | BNS: Mobile | G8 | 231 |
| DENY | 230 | Denied | | Not Billable - The Customer does not have a billing arrangement with the LEC for this NPANXX (OCN On-Net Screening). | G2 | 180 |
| DENY | 231 | Denied | | BNS: LEC Prepaid Telecommunications Card Station | G10 | 310 |
| DENY | 232 | Denied | | Feature Group A (FGA) | G4 | 000 |
| DENY | 233 | Denied | | BNS: LEC Public - Alternate Interface (functions controlled by set) | G10 | 302 |
| DENY | 234 | Denied | | BNS: LEC Public - Special Billing - Postpay Overtime (functions controlled by the network) | G10 | 306 |
| DENY | 235 | Denied | | BNS: LEC Public - Special Billing - Prepay Overtime (functions controlled by the network) | G10 | 307 |
| DENY | 236 | Denied | | BNS: Public - Incompatible Network Interface (interface other than standard or alternate) | G10 | 300 |

TABLE 3-continued

LIDB/LNP SOURCE TRANSLATIONS for ISP:

| Resp. Type In | Resp. Code In | ACTION | LIDB ADMIN ? | Description | rtfc type | EBI Code Out |
|---|---|---|---|---|---|---|
| DENY | 237 | Denied | | BNS: IC Public - Alternate Interface | G10 | 304 |
| DENY | 238 | Denied | | BNS: IPP (fka COCOT) - Standard Interface | | 311 |
| DENY | 239 | Denied | | BNS: Pager | G8 | 230 |
| DENY | 241 | Denied | | General, Reject - The LIDB could not read the format of the query. | S | 994 |
| DENY | 242 | Denied | | Invoke, Reject - The LIDB could not read the format of the query. | S | 994 |
| DENY | 243 | Denied | | Return Result, Reject - The LIDB could not read the format of the query. | S | 994 |
| DENY | 244 | Denied | | Return Error, Reject - The LIDB could not read the format of the query. | S | 994 |
| DENY | 245 | Denied | | Transaction Portion, Reject - The LIDB could not read the format of the query. | S | 994 |
| DENY | 246 | Denied | | BNS: Vacant Number - There is no line number assigned. | G2 | 180 |
| DENY | 247 | Denied | | BNS: Disconnected without referral - The line number was disconnected with no referral to a new line number. | G6 | 240 |
| DENY | 248 | Denied | | BNS: Changed to non-published number - The line number was changed to a non-published number. | o5 | 000 |
| DENY | 250 | Denied | | No Collect Calls, Screened Data - A screening mechanism is in place at the LIDB that does not allow charges to this line number. | O2 | 000 |
| DENY | 251 | Denied | | No Third-party calls, Screened Data - A screening mechanism is in place at the LIDB that does not allow charges to this line number. | O2 | 000 |
| DENY | 252 | Denied | | BNS: Screened Data - A screening mechanism is in place at the LIDB that does not allow charges to this line number. | G7 | 191 |
| DENY | 253 | Denied | | BNS: Screened Data - A screening mechanism is in place at the LIDB that does not allow charges to this line number. | G7 | 191 |
| DENY | 2110 | Denied | | BNS & No Calling Card, Unavailable network resource - This line or card number is not in the database. | O2 | 411 |
| DENY | 255 | Denied | | BNS: Screened Data - A screening mechanism is in place at the LIDB that does not allow charges to this line number. | G7 | 191 |
| DENY | 256 | Denied | | BNS: Being changed - The line number is being changed, it may not yet be connected. | G6 | 241 |
| DENY | 257 | Denied | | BNS: May not yet be connected - The line number may be new, it may not yet be connected. | G6 | 243 |
| DENY | 258 | Denied | | BNS: Temporarily disconnected - The line number is temporarily disconnected. | G6 | 244 |
| DENY | 259 | Denied | | BNS: Disconnected, calls being taken by operator - The line number is temporarily disconnected, the operator is taking calls. | G6 | 245 |
| DENY | 260 | Denied | | BNS: Temporarily removed from service - The line number is temporally removed from service. | G6 | 244 |
| DENY | 261 | Denied | | BNS: Not in service for incoming calls - This line number cannot accept incoming calls. | G2 | 182 |
| DENY | 262 | Denied | | BNS: Temporarily disconnected at customer request without referral - The line number is temporarily disconnected at the request of the customer without referral. | G6 | 245 |
| DENY | 263 | Denied | | BNS: Temporarily disconnected at customer request with referral - The line number is temporarily disconnected at the request of the customer with referral. | G6 | 246 |
| DENY | 264 | Denied | | BNS: Changed with referral to new number - The line number was changed. A referral to another line number is in place. | o5 | 000 |
| DENY | 265 | Denied | | Calling card blocked, PIN Nonpayment - The calling card is blocked because of nonpayment. | O2 | 000 |
| DENY | 266 | Denied | | Calling card blocked, Service Restriction on PIN - There is a service restriction on this PIN. | O2 | 000 |
| DENY | 267 | Denied | | Calling card blocked, no PINs assigned. There is no PIN assigned to this calling card/line number. | O2 | 000 |
| DENY | 268 | Denied | | Calling card blocked, service denial - There is a service restriction on this calling card. | O2 | 000 |
| DENY | 269 | Denied | | Calling Card - The calling card is a CIID (proprietary card) for which there is no host. | O2 | 000 |
| DENY | 270 | Denied | | BNS: Unexpected Data Value - No Collect or Third-Party Calls are allowed. | S | 994 |

TABLE 3-continued

LIDB/LNP SOURCE TRANSLATIONS for ISP:

| Resp. Type In | Resp. Code In | ACTION | LIDB ADMIN ? | Description | rtfc type | EBI Code Out |
|---|---|---|---|---|---|---|
| DENY | 272 | Denied | | LIDB/CCC Response Time-out - A response was not received from the host database within 4 seconds for a Telco query and 12 seconds for a Bank query. | S | 180 |
| DENY | 273 | Denied | | No Collect Calls at Customer Request - The end user customer requested the block for collect calls to this line number. | O2 | 000 |
| DENY | 274 | Denied | | BNS & No Calling Card Calls: Screened data. | O2 | 000 |
| DENY | 275 | Denied | | BNS: Hotel/Motel Auto Quote - with tax | G4 | 000 |
| DENY | 276 | Denied | | BNS: Dormitory Line | G4 | 225 |
| DENY | 277 | Denied | | BNS: Hotel/Motel Auto Quote - without tax | G4 | 000 |
| DENY | 278 | Denied | | BNS: PBX Line | G4 | 221 |
| DENY | 279 | Denied | | BNS: Prison (IPP fka COCOT) | G10 | 316 |
| DENY | 280 | Denied | | BNS: WATS Line | G4 | 222 |
| DENY | 281 | Denied | | No Third-party calls at Customer Request - The end user customer requested the block for third-party calls to this line number. | O2 | 000 |
| DENY | 282 | Denied | | BNS: LEC Public - Standard interface - Prepay Overtime | G10 | 301 |
| DENY | 283 | Denied | | BNS: Coinless (IPP fka COCOT) | G10 | 314 |
| DENY | 284 | Denied | | BNS: IC Public - Standard Interface | G10 | 305 |
| DENY | 285 | Denied | | BNS: Voice Quote - without tax | o6 | 450 |
| DENY | 286 | Denied | | BNS: Voice Quote - with tax | o6 | 451 |
| DENY | 287 | Denied | | BNS: IPP (fka COCOT) - Alternate Interface | G10 | 312 |
| DENY | 288 | Denied | | BNS: Hospital | G4 | 226 |
| DENY | 289 | Denied | | BNS: Prison (non-IPP fka COCOT) | G10 | 315 |
| DENY | 290 | Denied | | BNS: LEC Semi-Public | G10 | 308 |
| DENY | 291 | Denied | | BNS: Subsystem Congestion | S | 180 |
| DENY | 292 | Denied | | BNS: Subsystem Failure | S | 180 |
| DENY | 293 | Denied | | BNS: No translation for address of such nature | S | 180 |
| DENY | 294 | Denied | | BNS: Unequipped User | S | 999 |
| DENY | 295 | Denied | | BNS: Network Failure | S | 180 |
| DENY | 296 | Denied | | BNS: Network congestion | S | 999 |
| DENY | 297 | Denied | | BNS: Cellular (cellular is distinct from mobile) | G8 | 231 |
| DENY | 298 | Denied | | BNS and Calling Card - Although the NPANXX belongs to SWBT the end-user account number is no longer is a SWBT customer. The line number now belongs to another local service provider. | G4 | 228 |
| DENY | 299 | Failure | | LNP Only Look-Up, the NPANXX is not a portable range. | LNP | 000 |
| DENY | 301 | Denied | Y | Denied Originating Number (ANI) - The ANI has an Admin. block to automatically decline all attempts from this line number. (Admin. Reply) | G2 | 183 |
| DENY | 302 | Denied | Y | Terminating Number (DNI) has an Admin. block to automatically decline all attempts to this line number. (Admin. Reply) | G2 | 182 |
| DENY | 303 | Denied | Y | Calling card has an Admin. block to automatically decline all attempts to this line number. (Admin. Reply) | G2 | 000 |
| DENY | 304 | Denied | Y | Collect Number has an Admin. block to automatically decline all attempts to this line number. (Admin. Reply) | G2 | 000 |
| DENY | 305 | Denied | Y | Third Party Number has an Admin. block to automatically decline all attempts to this line number. (Admin. Reply) | G2 | 000 |
| DENY | 306 | Denied | Y | Commercial credit card has an Admin. block to automatically decline all attempts to this line number. (Admin. Reply) | G2 | 000 |
| DENY | 307 | Denied | Y | Group Number has an Admin. block to automatically decline all attempts from this group. (Admin. Reply) | G2 | 000 |
| DENY | 308 | Denied | Y | Global Negative Database Block - There is an Admin. block in the Global Negative Database to this line number for the Audiotext Industry. (Admin. Reply) | G2 | 000 |
| DENY | 309 | Denied | Y | Excessive calling card PIN hits - The threshold for bad PIN attempts for a calling card was exceeded in the Admin. fraud control system (Admin. Reply). This is the same as reply code 055. | G2 | 000 |
| DENY | 400 | Denied | | Commercial credit card, Invalid Commercial credit card - This is not a valid commercial credit card account number. It failed the MOD 10 check. Also an invalid amount, invalid date or a format error may cause this response. (Host or Admin. Reply) | | 506 |
| DENY | 401 | Denied | | Commercial credit card, Call issuer - The authorization attempt triggered a flag in the fraud control system of the issuing bank, Banknet or VISAnet. | | 507 |

TABLE 3-continued

LIDB/LNP SOURCE TRANSLATIONS for ISP:

| Resp. Type In | Resp. Code In | ACTION | LIDB ADMIN ? | Description | rtfc type | EBI Code Out |
|---|---|---|---|---|---|---|
| DENY | 402 | Denied | | Commercial credit card, Confiscate card - No billing is allowed to this account number. If possible confiscate this card. | | 508 |
| DENY | 403 | Denied | | Commercial credit card, Authorization Declined - No billing is allowed to this account number. | | 509 |
| DENY | 404 | Denied | | Commercial credit card, Unable to Validate Account Number - There is problem in authorizing this account number. | | 510 |
| DENY | 405 | Denied | | Commercial credit card, Card expired - No billing is allowed to this account number because the card has expired | | 511 |
| DENY | 406 | Denied | | Commercial credit card - Invalid Merchant ID | | 512 |
| DENY | 408 | Denied | | Commercial credit card, Invalid card and Address (zip code) - Both the account number and the address or zip code are invalid. Do not allow billing to this account number. | | 513 |
| DENY | 409 | Denied | | Commercial credit card, System Problem - There is a technical problem with the authorization system of the issuing bank, Banknet or VISAnet. | | 514 |
| DENY | 420 | Denied | | Commercial credit card, Over withdrawal limit - This account has exceeded the withdrawal threshold in the authorization system of the issuing bank | | 515 |
| DENY | 421 | Denied | | Commercial credit card, Over credit limit - This account has exceeded the credit threshold in the authorization system of the issuing bank | | 516 |
| DENY | 422 | Denied | | Commercial credit card, Lost card, Confiscate - This account number was reported lost. No billing is allowed to this account number. If possible confiscate this card. | | 596 |
| DENY | 423 | Denied | | Commercial credit card, Stolen card, Confiscate card - This card was reported stolen. No billing is allowed to this account number. If possible confiscate this card. | | 518 |
| DENY | 424 | Denied | | Commercial credit card, Invalid Pin - This means a bad PIN was used. | | 519 |
| DENY | 425 | Denied | | Commercial credit card, Allowable Number of PIN Tries Exceeded - The threshold for bad PIN attempts for a calling card was exceeded in the authorization system of the issuing bank, Banknet or VISAnet. | | 520 |
| DENY | 426 | Denied | | Duplicate transaction. The Authorization host considers this a duplicate transaction. | | 521 |

In the embodiment of the invention depicted in the drawings, regardless of the type of service provider or the type of validation request, all clients or vendors 22 typically need a profile so that the process or method carried out by the module 200 knows how to treat the request. The client or vendor profile is set up in a database which includes the indicators that are set for the type and tests for each request which will be subsequently received from the vendor.

Client or Vendor Profile Table

| Fields | Data Type | Key |
|---|---|---|
| Name | Char (10) | |
| Client | Char (4) | Primary |
| Product | Char (3) | |
| Transtype | Char (3) | |
| BTN_vs_AMI | Null or not | |
| Global_Offnet | Null or not | |
| Client_Offnet | Null or not | |
| Product_Offnet | Null or not | |
| Calling_Card_Offnet | Null or not | |
| Plan_Offnet | Null or not | |
| ONNET | Null or not | |
| CLEC | Null or not | |
| Block42 | Null or not | |
| Unbill | Null or not | |
| Cancel | Null or not | |
| Smart_LIDB | Null or not | |
| Area_Code_Split | Null or not | |
| Zip | Null or not | |
| BNA | Null or not | |
| BNA_AVAIL | Null or not | |
| Threshold | Null or not | |
| Client_Bad_ANI | Null or not | |
| Global_Bad_ANI | Null or not | |
| Product_Bad_ANI | Null or not | |
| NON-PAY | Null or not | |
| Goodwill | Null or not | |
| Return_To_Sender | Null or not | |
| Credit_Check | Null or not | |

Note:
Some tests are required for certain validation types.

In certain embodiments, the client or vendor profile is used to determine which validation request type to convert from or to, which validation checks should be performed on the ANI/BTN for the particular purchase event, which checks are to be performed for the pre-billing validation event at the time of billing, and the billing record conversion specifics for that client or vendor. Thus, the facility 28 may customize is validation procedures to suit a specific client or vendor.

For the both the validation events, the client profile check is typically performed in facility 28 prior to carrying out the validity checks. For example, the customer profile check may be included in step 98 (see FIG. 13) and step 142 (see FIG. 14). The customer profile includes client specific information which may determine the nature and extent of the validation process. Accordingly, the profile may be checked as soon as the record is received from a registration module or the customer management system 58. In use, a profile table is queried to identify the validation checks to be performed by the module 30 and the checks may differ between an initial purchase event or transaction and an associated subsequent billing event at the end of a bill cycle. These checks may, dependent on the client profile, include checking if the ANI is the same as the BTN, if the subscriber line is listed in OFFNET database 222, in the UNBILLS database 232, in the Blocking databases 228,230, in the CLEC database 226, in the LIDB database 252, in the address verification database 244, or in databases including data on previous credits, new lines, business lines area codes, area code changes, or the like.

Additionally, the client profile is typically checked to see which billing record should be written for inclusion on the phone bill for that particular purchase. This may occur as the first part of step 218 in FIG. 15 and step 260 in FIG. 17.

The client profile can also be used to determine the type of billing record to convert from and the type to convert to for inclusion the telephone account 34 for the purchase or transaction. For example, the types of billing records may include a 425001 record for a monthly recurring charge; 010101, 010105, 010102, 010116 type records for detailed, usage-based events; and 415001, 410101, 410105, 410102, 410116 records for the credit records.

Figure 17:
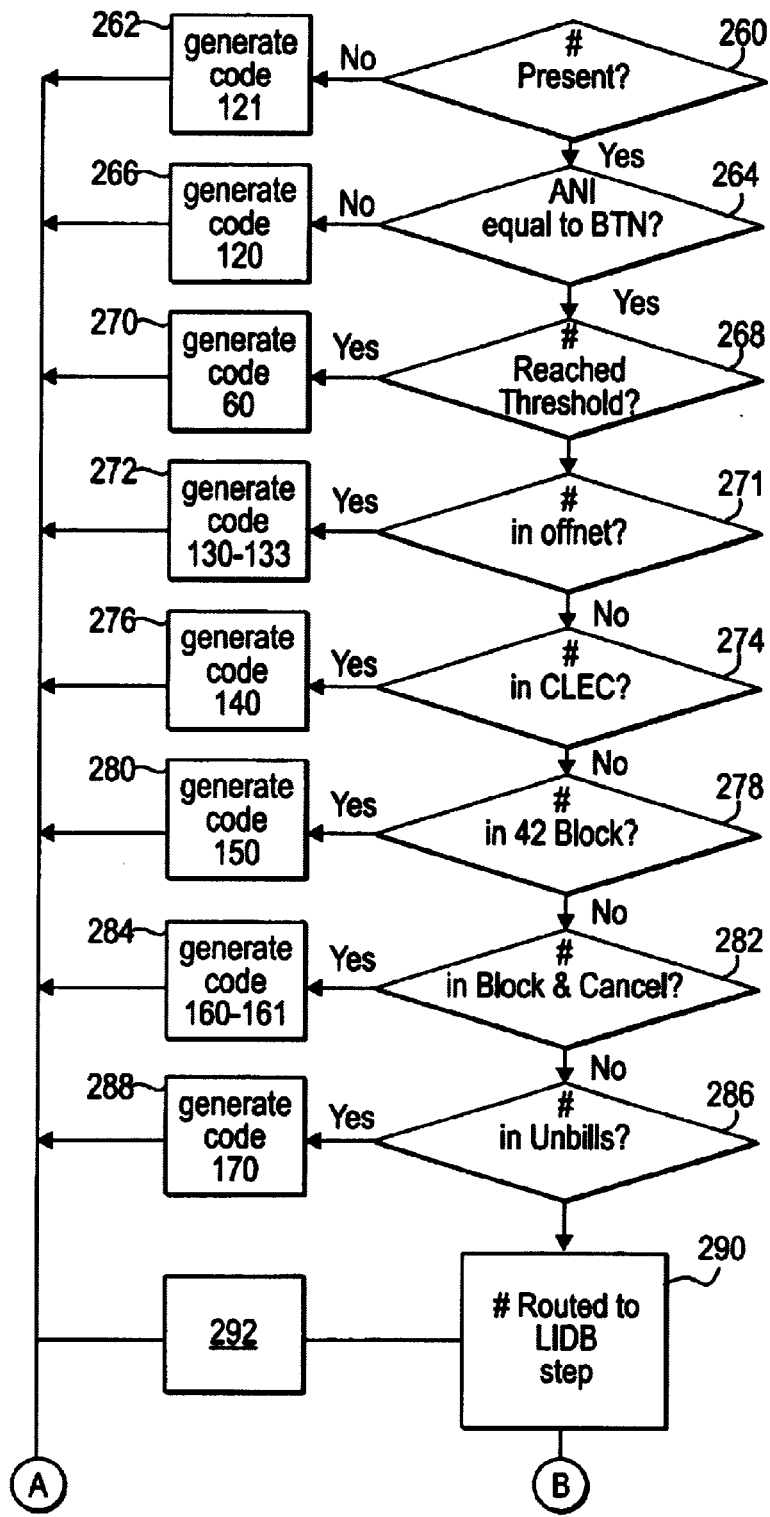
FIGS. 17–19 show schematic flow charts of the validation method or procedure carried out by the validation module of FIGS. 6 and 15.
Figure 19:
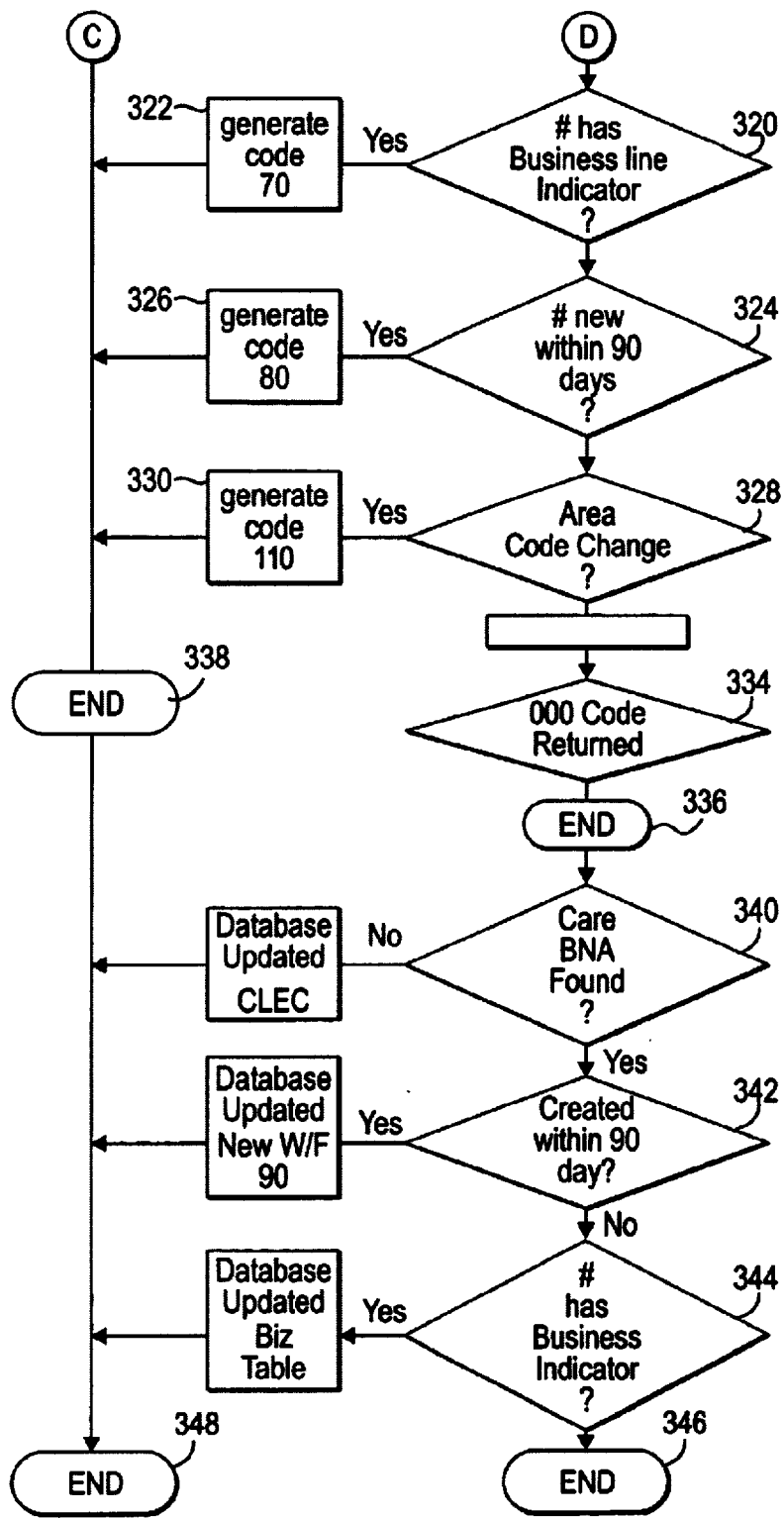

An example of software tables for implementing the steps in the method set out in the flow diagrams shown in FIGS. 17 to 19 are shown below.

The first table shows the steps in the BTN test descriptions process. Typically, a set of core tests is run for each client. Additionally, clients may have some configuration options to identify the tests that best fit their program.

| PROCESS | TESTs | PURPOSE |
|---|---|---|
| BILLABLE BTN TESTs | | |
| VAL/Pre-bill | Client profile | Client profile for each id for BTN validation process test flags. |
| VAL only | ANI = BTN | Determines if originating number = BTN input by caller. |
| VAL/Pre-bill | Invalid # OFFNET | Ids Invalid NPAs & NXXs |
| VAL/Pre-bill | Global OFFNET | Ids (NPA)NXX & OCN combinations where there is not a B&C agreement |
| VAL/Pre-bill | Product OFFNET | Ids (NPA)NXX & OCN combinations where the traffic type is not approved to bill (Jul. 24, 2001: MRC only for NECA and Illuminet Only) |
| VAL/Pre-bill | Client OFFNET | Ids (NPA)NXX & OCN combinations where there the Client id (7###) is not approved to bill |
| VAL/Pre-bill | Special Calling Card OFFNET | Ids (NPA)NXX & OCN combinations of special calling card #s for non-calling card traffic that are unable to be billed |
| VAL/Pre-bill | Plan OFFNET | Ids (NPA)NXX & OCN combinations where a Client Plan is not approved to bill |
| VAL/Pre-bill | ONNET | Ids (NPA)NXX & OCN combinations where there are B&C agreements |
| VAL/Pre-bill | CLEC | Ids (NPA)NXX-xxxx's are not billable due to CLEC for all Clients. |
| VAL/Pre-bill | 4250 BLOCK | Ids (NPA)NXX-xxxx's that have a 4250 billing block (for MRC only) |
| VAL/Pre-bill | UNBILL | Ids (NPA)NXX-xxxx's that have unbilled previously for all Clients |
| VAL/Pre-bill | Block & Cancel - GLOBAL | Ids (NPA)NXX-xxxx's that requested a Block and/or Cancel; usually institutional |
| VAL/Pre-bill | Block & Cancel - Client Specific | Ids (NPA)NXX-xxxx's that requested a Block and/or Cancel for a particular Client id |
| VAL/$1^{st}$ + n Pre-bill | Val Code Cache | Ids (NPA)NXX-xxxx & Return Code combinations for previous request |
| VAL/$1^{st}$ Pre-bill | LIDB Validity Test | To determine the billable status of the return code from the LIDB dip |
| VAL/$1^{st}$ Pre-bill | LIDB CLEC RAO | Ids RAOs that belong to CLECs |
| VAL/$1^{st}$ Pre-bill | LIDB CLEC OCN | Ids known CLEC OCNs |
| VAL/$1^{st}$ Pre-bill | LIDB State Specific Conversion | To determine if the returned LIDB code is a state specific code and then a conversion to the billable OCN for the ONNET check |
| VAL/$1^{st}$ Pre-bill | LIDB ONNET | Ids billable (NPA)NXX & returned OCN combinations |
| ALL | VAL Trans Log | Log of each validation request and response by Client ID |
| | BTN CREDIT SCORING | |
| VAL/Pre-bill | AREA CODE Change indicator | Provides the new area code for the line number while in permissive dialing period. |
| Val | ZIP MATCH | ZIP matches zip codes for (NPA) NXX (not in production as of June 2001) |
| VAL/Pre-bill | ANI WATCH - CLIENT (SOURCE: all) | (NPA)NXX-xxxx's where there a refund/chargeback has been issued previously for this Client ID |

-continued

| PROCESS | TESTs | PURPOSE |
|---|---|---|
| VAL/Pre-bill | ANI WATCH - CLIENT (SOURCE: client) | (NPA)NXX-xxxx's where there a refund has been issued previously for this Client ID |
| VAL/Pre-bill | ANI WATCH - CLIENT (SOURCE: ebi/telco) | (NPA)NXX-xxxx's where there a chargeback/bad debt has been issued previously for this Client ID |
| VAL/Pre-bill | ANI WATCH - GLOBAL (SOURCE: all) | (NPA)NXX-xxxx's where there a refund/chargeback/bad debt has been issued previously from CLIENT, ebi or telco |
| VAL/Pre-bill | ANI WATCH - PRODUCT (SOURCE: all) | (NPA)NXX-xxxx's where there a refund/chargeback/bad debt has been issued previously for the same product |
| VAL | Address Verification | Not Available |

TEST BEFORE FIRST BTN BILLING

| VAL/Pre-bill | LEC CARE FEED | Determines if the ILEC owns the Acct. for billing |
|---|---|---|
| VAL/Pre-bill | Biz vs Res | Determines the commercial or consumer status for credit score |

Example TESTs

| VAL/Pre-bill | Threshold by Client | Determines whether the BTN has met a Client specific threshold |
|---|---|---|
| VAL/Pre-bill | LEC PROV feed | To determine if LEC owns Acct |
| VAL/Pre-bill | Credit Check | Credit header files check from Credit source |
| VAL/Pre-bill | New within 90 days | Determines if BTN is less than 90 days old; affects credit score |

ON/OFFNET Family Tables (Billing Coverage)

The OFFNET table family contains OCN & NPA_NXX combinations where billing is not approved. If found, the BTN does not continue on the validation path.

| Fields | Data Type | Key |
|---|---|---|
| Invalid # OFFNET Table | | |
| NPA_NXX | Numeric(6) | Primary |
| OFFNET Global Table | | |
| NPA_NXX | Numeric(6) | Primary |
| OFFNET Product Table | | |
| OCN | Int(4) | |
| NPA_NXX | Numeric(6) | Primary |
| NSP_Product | Varchar(10) | Primary |
| OFFNET Client Table | | |
| OCN | Int(4) | Primary |
| Client ID | Char(4) | Secondary |
| Special Calling Card OFFNET Table | | |
| OCN | Int(4) | |
| NPA_NXX_xxxx | Numeric(10) | Primary |
| Plan OFFNET Table | | |
| Client id | Char(4) | Primary |
| OCN | Int(4) | Primary |
| NPA_NXX | Numeric(6) | Primary |
| NSP_Plan | Char(3) | Primary |

The ONNET table determines if an NPA_NXX & OCN combination can be found among the billable combinations. In this case a match, allows the BTN to move further on the validation path. A no match will return a failure.

| Fields | Data Type | Key |
|---|---|---|
| ONNET Table | | |
| OCN | Numeric(4) | |
| NPA_NXX | Numeric(6) | Primary |

The CLEC table consists of CLECs that the proprietor, or user of the module 200, does not have billing contracts with. This table is specific to the line number. Sources dictate the fields that will be present for the record. A match here is considered a fail and does not continue.

| Fields | Data Type | Key |
|---|---|---|
| CLEC Table | | |
| BTN | Numeric(10) | Primary |
| Julian | Char(3) | |
| Year | Char(2) | |
| Date | DateTime | |
| OCN | Int(4) | |

The 4250 Block table consists of specific line numbers that cannot be billed for 4250-01 record types. A match in this table stops the validation movement.

| Fields | Data Type | Key |
|---|---|---|
| 4250 Block Table | | |
| BTN | Numeric(10) | Primary |
| Julian | Char(3) | |
| Year | Char(2) | |
| Date | DateTime | |

Bill Control Family Tables

The Unbills or unbillable table holds all the BTNs that have been sent to a subscribers bill page but could not be placed on the bill page for various reasons. A match here halts the validation sequence for the subject BTN.

| Fields | Data Type | Key |
|---|---|---|
| Unbill Table | | |
| BTN | Numeric(10) | Primary |
| Client id | Int(4) | Secondary |

-continued

| Unbill Table | | |
|---|---|---|
| Fields | Data Type | Key |
| Product | VarChar(3) | Tertiary |
| Date | DateTime | |
| Reason Code | AlphaN(2) | |

Block and cancel tables identify BTNs that have requested a permanent or a Client specific block for billing. A match sends a failed response.

| Fields | Data Type | Key |
|---|---|---|
| Block & Cancel - Global Table | | |
| BTN | Numeric(10) | Primary |
| Date | DateTime | |
| Block & Cancel - Client Specific Table | | |
| BTN | Numeric(10) | Primary |
| Date | DateTime | |
| Client id | Numeric(4) | Secondary |

Validation Cache is a table that holds responses in order not to process duplicates (e.g., Submit pressed 10 times). A match here will return the code stored from a previous request.

| Validation Cache Table | | |
|---|---|---|
| Fields | Data Type | Key |
| BTN | Numeric(10) | Primary |
| Response | Char(3) | |
| Date | DateTime | |

LIDB Family Tables

LIDB is a third party that supplies information to the phone line number level. The module 30 typically tests and stores as many relevant fields as can be requested in a transaction.

| LIDB Codes Table | | |
|---|---|---|
| Fields | Data Type | Key |
| LIDB | Char(3) | Primary |
| Description | Char(100) | |
| RFC | Char(3) | |
| ISP | Char(3) | |
| OSP | Char(3) | |
| CCC | Char(3) | |
| LDD | Char(3) | |
| CRC | Char(3) | |

The LIDB Validity Table translates the LIDB code into a billable or non-billable response according to predefined business rules. A fail here will halt the validation for the request.

| LIDB Validity Translation Table | | |
|---|---|---|
| Fields | Data Type | Key |
| BTN | Numeric(10) | Primary |
| Date | DateTime | |
| LIDB_Code | Char(3) | |
| OCN | Char(4) | |
| TransType | Char(3) | |
| Updated | bit | |
| RAO | Char(3) | |

The State specific table is a conversion from a true OCN to a known State Specific OCN that is billable. A match here will trigger the conversion, the BTN continues in the validation process.

| LIDB State Specific OCN Table | | |
|---|---|---|
| Fields | Data Type | Key |
| ST_OCN | Numeric(4) | Primary |
| Billable_OCN | Numeric(4) | |

The transaction log is the history of each transaction request and response that is processed through the validation system.

| VAL Transaction Log Table | | |
|---|---|---|
| Fields | Data Type | Key |
| CLIENT ID | Int(3) | |
| ANI | Numeric(10) | |
| LidbCode | Char(3) | |
| Date | DateTime | Primary |

The TPM indicates that an NPA is in the permissive dialing period. A match here appends the record with the updated number for a record update.

| Fields | Data Type | Key |
|---|---|---|
| TPM Change Table | | |
| NPA_NXX | Numeric(6) | Primary |
| DATE | DateTime | |
| TPM Delete Table | | |
| NPA_NXX | Numeric(6) | None |
| DATE | DateTime | None |

\* See Exhibit A

Validation Table Maintenance

TABLE LOAD

| TABLE | SCHEDULE | SOURCE | HOW |
|---|---|---|---|
| Client profile | Adds & changes | CSA | Manual |
| ANI = BTN | NA | NA | NA |
| Invalid # OFFNET | Adds & changes | Rejects/Unbills* | Manual |
| Global OFFNET | 2× weekly Thurs for Mon cycle Tues for Thurs cycle | CYCLE OFFNET P:/WC30/FILES/ONOFF CIC: 903 | Full Replace |
| Product OFFNET | Fridays | Client Directory Cust7000 Directory | Full Replace |
| Client OFFNET | Fridays | Client Directory CYCLE files Load for each client id. | Full Replace |
| Special Calling Card OFFNET | Fridays | CYCLE OFFNET P:/WC30/FILES/ONOFF CIC: 903 | Full Replace |
| Plan OFFNET | Adds & changes | NA | Manual |
| ONNET | 2× weekly Thurs for Mon cycle Tues for Thurs cycle | CYCLE ONNET P:/WC30/FILES/ONOFF CIC: 903 | Full Replace |
| CLEC1 | Mondays | CLEC MASTER* | Incremental adds |
| CLEC2 | as process LIDB responses | Fails for LIDB OCN/RAO tests | Insert with source |
| CLEC3 | as process BNA responses | TCSI 2618s, 2619s codes that fail for BNA | Insert with source |
| 4250 BLOCK | Mondays | Block42 Master | Incremental adds |
| UNBILL | Mondays | Unbill Master from UB1s | Incremental adds |
| Block & Cancel - GLOBAL | Mondays | INQ file | Incremental adds |
| Block & Cancel - Client Specific | Mondays | INQ files for Clients | Incremental adds |
| Val CACHE | as process LIDB requests | LIDB requests | Insert new |
| LIDB Validity Test | NA | NA | NA |
| LIDB CLEC RAO | as process LIDB requests | Code 998 only (new Telcordia source) | TBD |
| LIDB CLEC OCN | As process LIDB requests | P:OCN.dat | Full replace |
| LIDB State Specific | Adds & changes | NA | manual |
| VAL Trans Log | Adds | NA | All adds |
| AREA CODE Change indicator | Adds | TPM | All adds |

*See Exhibit B for Billing rejects and Unbills codes that are loaded into tables.

TABLE PURGE

| TABLE | SCHEDULE | TRIGGER | HOW |
|---|---|---|---|
| Client profile | changes | NA | manual |
| ANI = BTN | NA | | |
| Invalid # OFFNET | changes | NA | manual |
| Global OFFNET | See load | See load | Full replace |
| Product OFFNET | See load | See load | Full replace |
| Client OFFNET | See load | See load | Full replace |
| Special Calling Card OFFNET | See load | See load | Full replace |
| Plan OFFNET | See load | See load | Full replace |
| ONNET | See load | See load | Full replace |
| CLEC | 90 days | Insert date | Delete from table |
| 4250 BLOCK | 180 days | | Delete from table |
| UNBILL | OCN Moratorium | Insert date and elapsed time | Delete from table |
| Block & Cancel - GLOBAL | No purge | | Delete from table |
| Block & Cancel - Client Specific | Every 6 months | From insert date | Delete from table |
| VAL CACHE | >2 < 30 days; >180 days | From insert date | Delete from table |
| LIDB Validity Test | As changes | NA | Manual |
| LIDB CLEC RAO | See load | NA | Full replace |
| LIDB CLEC OCN | See load | NA | Full replace |
| VAL Trans Log | No purge | | |

| | | | |
|---|---|---|---|
| *-continued* | | | |
| AREA CODE Change indicator | Monthly | Completion of Permissive Dialing period | TPM deletions |

*See Exhibit C OCN Moratorium schedule.

Exhibit A

Example Tables

Zip to NPA_NXX source allows for best 3 zips for an NPA_NXX combination. Tests show a 70% match rate. This rate has been improved by matching to position 1–3 of the Zip. The low match rate combined with the fact that a BTN is not a portable instrument, this test is not recommended for BTN validation.

Zip Match Table

| Fields | Data type | Key |
|---|---|---|
| NPA_NXX | Numeric(6) | Primary |
| ZIP1 | Numeric(5) | None |
| ZIP3 | Numeric(5) | None |
| ZIP3 | Numeric(5) | None |

The following tests are optionally carried out in other embodiments of the invention.

ANI WATCH Table

| Fields | Data Type | Key |
|---|---|---|
| BTN | Numeric(10) | Primary |
| NSP_Product | Char(5) | None |
| Client id | Numeric(3) | None |
| DATETIME | Numeric(4) | None |
| SOURCE | Numeric(6) | None |

The ANI Watch has BTNs that have been given an adjustment for charges by the Client, proprietor or user of the module 200 or the Telco. This is to help the client determine the credit score for the BTN.

| Fields | Data Type | Key |
|---|---|---|
| Billing Name and Address Table | | |
| Name | Varchar(30) | None |
| Address1 | Varchar(30) | None |
| Address2 | Varchar(30) | None |
| Address3 | Varchar(30) | None |
| City | Varchar(20) | None |
| State | CHAR(2) | None |
| Zip + 4 | Numeric(10) | None |
| BTN | Numeric(10) | None |
| DATE | DateTime | None |
| Source | Varchar(20) | None |
| BTN Thresholding Table | | |
| BTN | Numeric(10) | None |
| DATE | DateTime | None |
| Client ID | Numeric(3) | None |
| eBi RESPONSE CODE | Char(3) | None |

| | | |
|---|---|---|
| *-continued* | | |
| NSP Product | Char(10) | None |
| Total | Int(4) | None |

Exhibit B

Loaded Rejected and Unbill Codes

| Reject Codes | Reject Code Description | LOAD in DB? | DB? | PURGE? |
|---|---|---|---|---|
| 15 | ORIGINATING NXX INVALID (NXX = 555 OR 976) | Y | Invalid OFFNET | N |
| 44 | BILLING NXX INVALID (NXX = 555 OR 976) | Y | INVALID | N |
| 48 | REFUSE TO PAY/END USER REJECT | Y | B&C | NORMAL |
| 74 | LEC REQUESTED BLOCK | Y | B&C | NORMAL |
| 93 | REGULATORY BLOCK | Y | B&C | NORMAL |
| 94 | INTRASTATE LEC BLOCK | Y | B&C | NORMAL |
| 95 | ANI BLOCK | Y | B&C | NORMAL |
| 98 | NON-LOCAL INTRASTATE BLOCK | Y | B&C | NORMAL |

| Unbill Codes | Unbill Code Description | LOAD in DB? | DB? | PURGE? |
|---|---|---|---|---|
| M0 | SHARED NPA-NXX (CLEC) | Y | CLEC | 90 DAYS |
| 12 | ORIG NPA/NXX NOT ON TPM | Y | Invalid OFFNET | NEVER |
| 15 | ORIG NXX INVALID (NXX = 555 OR 976) | Y | Invalid OFFNET | NEVER |
| 16 | ORIG NPA INVALID | Y | Invalid OFFNET | NEVER |
| 30 | TERM NPA = 800 | Y | Invalid OFFNET | NEVER |
| 44 | BILLING NXX INVALID (NXX = 555 OR 976) | Y | Invalid OFFNET | NEVER |
| AS | INVALID NPA CODE | Y | Invalid OFFNET | NEVER |
| 18 | ORIG NUM INVALID | Y | UNBILL | OCN |
| 34 | TERMINATING NUMBER INVALID | Y | UNBILL | OCN |
| 36 | SPECIAL BILLING NBR - AT&T ONLY | Y | UNBILL | OCN |
| 37 | SPECIAL BILLING NBR - CINCINNATI BELL ONLY | Y | UNBILL | OCN |
| 38 | SPECIAL BILLING NUMBER INVALID | Y | UNBILL | OCN |
| 41 | BILLING NPA/NXX IN SPECIAL BILL NBR NVALID | Y | UNBILL | OCN |
| 59 | SUSPECTED FRAUD | Y | UNBILL | OCN |
| A1 | SUSPECTED FRAUD NUMBER | Y | UNBILL | OCN |
| A7 | INVALID BILL TO COIN ACCOUNT | Y | UNBILL | OCN |
| A8 | NO ACCOUNT | Y | UNBILL | OCN |

-continued

| | | | | |
|---|---|---|---|---|
| B0 | NO ACCOUNT AFTER INVESTIGATION | Y | UNBILL | OCN |
| D6 | INVALID BILLING NUMBER | Y | UNBILL | OCN |
| E6 | CALLS OVER $999.99 | Y | UNBILL | OCN |
| F1 | BILLED TO CELLULAR/MOBILE NUMBER | Y | UNBILL | OCN |
| G1 | ACCOUNT IN WRITE-OFF STATUS | Y | UNBILL | OCN |
| H8 | REBILL - NO LONGER BILLABLE BY PB | Y | UNBILL | OCN |
| K2 | TOLL BILLING RESTRICTION | Y | UNBILL | OCN |
| U0 | DENY ALL KNOWLEDGE (DAK) | Y | UNBILL | OCN |
| U6 | END-USER ACCOUNT IN FINAL STATUS | Y | UNBILL | OCN |
| K4 | LEC INITIATED BILL BLOCK | Y | UNBILL | OCN |
| L6 | DENIAL STATUS RESTRICTION (891/CIID) | Y | UNBILL | OCN |
| L7 | DISCONNECTED ACCOUNT DUE TO NONPAYMENT | Y | UNBILL | OCN |
| V7 | RESTRICTED ACCOUNT | Y | UNBILL | OCN |
| A9 | EC DOES NOT HAVE BILLING ARRANGEMENT WITH IC | Y | UNBILL | OCN |

Exhibit C
OCN Purge Schdeule

| Days | NAMES | OCNS |
|---|---|---|
| 90 | Ameritech, Pac Bell, Nevada Bell, SNET, SWBT, Bell Atlantic, Nynex, Bell South | 9321, 9323, 9325, 9327, 9329, 9740, 9742, 9147, 9102, 9104, 9206, 9208, 9210, 9211, 9212, 9213, 9214, 9496 |
| 120 | Sprint United | 0341, 0470, 832, 9993 |
| 180 | CBT, GTE, NECA, Illuminet, Alltel, Citizens, Qwest, default | All others |

Unlike conventional use of the LIDB database that uses the LIDB data to obtain information on a destination/termination or recipient location or subscriber unit, the module 200, in accordance with the invention, uses the industry standard LIDB database to obtain relevant information on the initiating subscriber line 96. The subscriber line reference data obtained from the LIDB database is then processed to generate modified validity codes, which provide a vendor with data to facilitate deciding whether or not a transaction should be processed. The LIDB/LNP database is queried as if a collect call event is occurring and a call is thus mimicked. The processing of the transaction typically involves communicating the relevant transaction data to a folder of the subscriber's account with a relevant Telco. The method of, and module 200 for, validating the billing account associated with the subscriber line allows, for example, a subscriber line to be used to validate and conclude a transaction instead of using a conventional payment techniques such as a credit card, debit card, bank account details or the like.

A current industry-wide problem is the lack of ability of a service provider to identify when a line subscriber has switched his service to a CLEC since the service provider may not have an existing billing arrangement with such a CLEC and may also not have a source for the BNA to allow for a direct billing solution. LNP databases were originally established for the purpose of directing call routing activities among facilities-based carriers and most telephone numbers ported to a CLEC do not involve a facility change (the CLEC may be simply reselling the incumbent LEC's facilities). This means that, for billing decision purposes, LNP queries usually provide an incorrect response.

The LNP queries are enhanced by analyzing and interpreting other field elements included within the query response. Specifically, certain values or, in some cases, the absence of certain values, in the Operating Company Number ("OCN") and/or the Regional Accounting Office ("RAO") fields, allows further accuracy in the validation response. While the definitions of the OCN and RAO field elements can be obtained from industry sources, their interpreted use in the validation process is unique to the present invention. Use of these additional data elements can improve the reliability of the validation event.

LNP results may be supplemented with CARE queries in LEC regions where LNP results are inadequate and CARE costs are not otherwise prohibitive based on the retail price of the underlying service. CARE provides a reliable result on CLEC-ported numbers since its basic purpose is to provide subscriber account information (such as billing name and address). Once a number is ported to a CLEC, the incumbent LEC no longer has subscriber responsibility and will, therefore, return an "unavailable" response, even if the LEC's dial-tone facility is still being utilized. This negative response is then used to generate a "deny" status on the subscriber based on the current lack of CLEC billing support.

The validation process is also supplemented through the use of internal databases built from information gathered throughout the billing and collection process.

It is important to appreciate that all of the steps in the method executed by the module 200 need not be executed in real time. Typically, after the approval code 000 has been generated by the module 200 at step 334 the module 200 terminates its pre-validation check routine as shown at step 336. At this point the module 200 may merely provide pre-validation data or verification data to indicate to the vendor 22 if the subscriber line 96 is billable. Thus the module 200 may, in a first interaction with the vendor 22 provide pre-validation data, and in a second interaction process billing information. During the processing of billing information the validation process may once again be executed. In certain embodiments, the first interaction may be in the form of a registration process during which the validation procedure is carried out to register a subscriber line 96. The vendor 22 may then conduct numerous transactions with subscriber and subsequent validation checks on the subscriber line may then only be carried out on a periodic basis as described above.

After the validation code has been sent to the vendor 22, and the pre-validation procedure has been complete, the module 200 then carries out the fraud checks on a non-real time basis (usually during the next 48 to 72 hours) as shown in steps 340 to 344. The information obtained during the fraud control checks, if necessary, is used to update the various databases. In particular, after a BTN has been successfully validated but before a billing event takes place, the CARE investigation steps 340 to 344 are executed. The module 200 is typically arranged to interrogate offsite CARE databases and the results of the enquiry are stored in the CARE database 246. Checks on the data received from the CARE databases are then performed whereafter one or more of the other databases may be updated with the results. For example, the CARE database 246 may be updated, new within 90 days information, business indicator information, or the like. CARE codes 2618 and 2619 typically indicate that the BNA is not available and that the LEC no longer owns the account.

The updating of the databases following the CARE investigation allows enhanced future checks by the module 200 in a subsequent pre-validation procedure or subsequent registration event validation event. The updated information may be provided to the vendor 22. However, if the BTN information returned from the CARE database 246 does not meet predefined criteria, the other databases of the module 200 are not updated.

When a purchase validation event or billing event is declined, fails, unbillable or is negative event for any reason, the purchaser is preferably apprised. The manner in which the failure is treated depends upon the point in time and the reason the transaction validation or billing event fails.

In certain embodiments, a business rule table drives the treatment method and course based on when the failed event occurred during the validation process and the reason for the failure. With a purchase validation event, the option may be provided to interact with the purchaser at the time of requesting the purchase. For example, the option to change failed information for a revalidation or to change to another payment option may be provided. An example of customer failure may be as follows:

| If a purchase validation event fails: | Then the customer treatment may be: |
|---|---|
| ANI = BTN | Screen pop requesting new number and or to call from the matching number. |
| Missing or incorrect cust code | Screen pop requesting correct cust code. |
| THRESHOLD | Screen pop explaining this and a request for another payment method. |
| OFFNET | Screen pop explaining this and a request for another payment method. |
| CLEC | Screen pop explaining this and a link to change carrier to ILEC. Or request another payment option. |
| 42 Block | Screen pop explaining this and a link to ILEC to unblock 4250. Or request another payment option. |
| BLOCK and CANCEL | Screen pop explaining this and a request for another payment method. Also include explanation as to how to unblock. |
| UNBILLs | Screen pop explaining this and a request for another payment method. |
| LIDB Code Fail | Screen pop explaining this and a request for another payment method. |
| LIDB RAO/OCN fail | Screen pop explaining this and a link to change carrier to ILEC. Or request another payment option. |
| ADDRESS VERIFICATION | Screen pop requesting correct information. |
| Previous | Screen pop explaining this and a link to inquiry |

-continued

| If a purchase validation event fails: | Then the customer treatment may be: |
|---|---|
| Adjustment | chat or inquiry call information. |
| Unpaid Balance | See above. |

At the time of a pre-billing validation event or a failed billing event, the interaction with the purchaser will be after the fact and is typically in a screen pop at the next sign-on and in email form. In certain embodiments, there is a preset length of time to correct the failed information for a revalidation or change to a new payment method.

| If a pre-bill validation event fails: | Then the customer treatment may be: |
|---|---|
| OFFNET | Screen pop at next id sign-on explaining this and requesting change of payment method. Email containing the same information and link to update payment information. |
| CLEC | Screen pop at next id sign-on explaining this and instructions how to solve or update payment method information. Email containing the same information and a link to change carrier to ILEC and link to update payment method. |
| 42 Block | Screen pop at next id sign-on explaining this and instructions how to solve or update payment method information. Email containing the same information and link to unblock at ILEC or link to update payment information. |
| BLOCK and CANCEL | Screen pop at next id sign-on explaining this and instructions how to solve or update payment method information request for another payment method. Email requesting the same information and a link to change carrier to ILEC and link to update payment method |
| UNBILLs | Screen pop at next id sign-on explaining this and requesting change of payment method. Email containing the same information and link to update payment information. |
| LIDB Code Fail | Screen pop at next id sign-on explaining this and requesting change of payment method. Email containing the same information and link to update payment information. |
| LIDB RAO/OCN fail | Screen pop at next id sign-on explaining this and instructions how to solve or update payment method information. Email containing the same information and a link to change carrier to ILEC and link to update payment method |
| Previous Adjustment | Screen pop at next sign-on explaining this and a link to inquiry chat or inquiry call information. |
| Unpaid Balance | See above. |

| If a billing event fails: | Then the customer treatment may be: |
|---|---|
| Unbills | Screen pop at next id sign-on explaining this, requesting payment of unbilled charge and suggestions of ways to solve including a link to switch back to the ILEC and a way to update new phone number. It will also include a request for a change of payment method. Email containing the same information, link to change back to ILEC, to update with a new phone number, update to update payment information also contains link to inquiry chat or inquiry call. |
| Chargeback | Screen pop at next sign-on explaining this and a link to inquiry chat or inquiry call information. |
| Bad Debt Write-off | Screen pop at next sign-on explaining this and a link to inquiry chat or inquiry call information. |

Once the treatment period passes, the account access is typically denied and more traditional ways of saving, winning back, and reactivation or collections activities would take place.

In the embodiment described above, information on the subscriber line 96 is forwarded by the service provider or vendor 22 to the module 200 for validation. However, in other embodiments of the invention, the consumer or user may call the module 200 directly, as shown by line 350 in FIG. 1, and the ANI may then be obtained by the module 200 directly from the terminal 24 and not indirectly from the vendor 22. Further subscriber line data, e.g. BTN, address of the user and so on, may then also be obtained directly from the user. For example, the user may have appropriate software installed on his/her PC which allows the user to dial into the module 200 in an automated fashion should he/she wish to charge any requested goods or services to his/her subscriber account. The module 200 would then validate the subscriber line 96 using the method describer above. The module 200 then typically communicates a validation code (e.g. corresponding to approval or non-approval) to the vendor 22 as shown by line 352. The vendor 22 would then conclude the transaction with the user if the subscriber line has been validated.

In the first iteration of the validation process in which a validation request is received from the vendor 22, the ANI of the subscriber line 96 is captured to identify the subscriber line to which the terminal 24 is connected so that the validation process can be executed and the transaction or purchase can be approved and the billing process can be effected. It is to be appreciated however that the validation process and further prosecution of the transaction may take place based on the BTN which the user enters but that the capturing of the ANI may reduce the likelihood of fraud. Thus, if the ANI is captured, it may be done during an initial enquiry, purchase event, or at any other time during the process.

In other embodiments of the invention, in addition to or instead of capturing the ANI, the system 20 may request a user to enter the unique number associated with every phone billing account that Telcos currently issue. These additional digits are typically found at the end of the account number on a conventional telephone bill. These digits, sometimes called customer codes, identify the account associated with that particular assignment of the phone number. These codes provide a way to avoid capturing the ANI because typically only the account holder has access to this number thereby reducing the chance of fraud. Thus, the display screen 86 of FIG. 11 optionally includes the field 364 in which a user can enter the customer codes. An appropriate database would then be interrogated to validate the subscriber line. In one embodiment of the invention, the interrogation is included in the LIDB step, and includes details on the account to the customer code level.

The customer codes may thus eliminate the need to capture the ANI by the module 60 (see FIG. 5) and, customer code data may be compared by the comparator module 218 (see FIG. 15) and as shown in step 264 in FIG. 17. As described above, the display screen 86 then includes the field 264 to accommodate this facility. Likewise, if the phone number is not confirmed, then the input screen would be provided with the customer code field.

When the customer code is used to validate the subscriber line 96, a step to interrogate the information is included in which additional information is sent to the LIDB database 252 (see FIG. 15) in step 124 of FIG. 13, and step 290 in FIG. 17. Additionally, steps relating to the return of LIDB data are updated to include the results of the interrogation of this piece of information.

The facility 28 may function as a type of clearing house. In particular, the facility 28 may be responsible or accountable for payment of the goods or services for each transaction to the service provider or vendor 22 and, in turn, receive payment from the Telco. As mentioned above, the module 200 updates the telephone bill or account 34 of the subscriber in an automated fashion (see line) and the bill 356 that the user receives (see FIG. 1) includes the charges for the goods and/or services provided by the vendor 22. The user pays the Telco 26 (see line 358), the Telco 26 pays the facility 28 (see line 360), and the facility 28 pays the vendor 22 (see line 362). It is important to appreciate that these payments need not take place at the same time. Typically, the payments between the Telco 26 and the facility 28, and the facility 28 and vendor 22, take place periodically in a batch fashion the PC 24, and modules 30, 32 are exemplary forms of computer systems or machines within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

Each machines includes a processor, a main memory and a static memory, which communicate with each other via a bus. The machines may further include a video display unit (e.g., a liquid crystal display (LCD) or a cathode ray tube (CRT)). The machine also includes an alpha-numeric input device (e.g. a keyboard), a cursor control device (e.g. a mouse), a disk drive unit, a signal generation device (e.g. a speaker) and a network interface device.

The disk drive unit includes a machine-readable medium on which is stored a set of instructions (i.e., software) embodying any one, or all, of the methodologies described above. The software is also shown to reside, completely or at least partially, within the main memory and/or within the processor. The software may further be transmitted or received via the network interface device. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

What we claim is:

1. A method of processing payment for a transaction, the method including:

providing a user with an option, via an electronic terminal used to carry out the transaction, to select payment for the transaction from a telephone account associated with a subscriber line to which the electronic terminal is connected;

receiving a user request entered into the electronic terminal to process payment from the telephone account;

investigating data associated with the subscriber line including retrieving information from a line identification database (LIDB) and performing a validation process;

selectively approving the transaction dependent upon an outcome of the investigation; and selectively routing processing of the transaction to a financial instrument gateway in the event of the validation process not validating the subscriber line.

2. A method as claimed in claim 1, which includes identifying a telephone number of the subscriber line using automatic number identification (ANI) techniques.

3. A method as claimed in claim 2, which includes combining the telephone number and transaction data to form a financial instrument record.

4. A method as claimed in claim 3, in which the financial instrument record is a credit card record.

5. A method as claimed in claim 1, which includes obtaining a user entered telephone number from the electronic terminal and comparing the user entered telephone number with the telephone number obtained using ANI techniques.

6. A method of validating a transaction conducted using an electronic terminal connected via a subscriber line to an electronic network, the method including:

receiving a financial instrument record associated with the transaction;

extracting a telephone number of a subscriber line from the financial instrument record;

interrogating at least one line identification database (LIDB) based on the telephone number to obtain validation data associated with the subscriber line and selectively validating the transaction according to the validation data; and communicating a validating message on approval of the transaction if the subscriber line is validated, and routing processing of the transaction to a financial card gateway in the event of the subscriber line is not validated.

7. A method as claimed in claim 6, in which charges for the transaction are included in an account associated with the subscriber line.

8. A transaction processing system for processing a transaction between a vendor and an electronic terminal connected via a communication line to a communication network, the system including:

an application interface for providing a user, via the electronic terminal used to carry out the transaction, with an option to select payment for the transaction from an account associated with the communication line to which the electronic terminal is connected, and receiving a user request entered into the terminal to process payment from the account; and a modification module connected to the application interface, the modification module generating a record which includes a unique identifier associated with the communication line and communicating the record to a validation module which validates the transaction based on data associated with the unique identifier, wherein payment is routed to financial card gateway if a validation module invalidates the transaction.

9. A system as claimed in claim 8, in which the communication line is a subscriber line and the unique identifier is a telephone number associated with the subscriber line.

10. A system as claimed in claim 9, which includes an automatic number identification (ANI) module automatically to identify the telephone number.

11. A system as claimed in claim 10, in which the validation module includes:

a telephone number extraction module for extracting a telephone number from the record, the telephone number defining the unique identifier; and a process module which interrogates at least one reference data base to obtain data associated with the telephone number and, in response thereto, generates a validation status.

12. A system as claimed in claim 10, in which the processor module interrogates a line identification database (LIDB).

13. A system as claimed in claim 10, in which the processor module validates the transaction if charges can be included in the account associated with the subscriber line, and invalidates the transaction if the charges cannot be included in the account.

14. A system as claimed in claim 11, which includes an exchange interface for interfacing the validation module to an accounting facility of a telecommunication company at which the account is held thereby automatically to include the charges for the transaction in the account.

15. A system as claimed in claim 8, in which the record is a financial instrument record.

16. A system as claimed in claim 15, in which the record is selected from a group including a credit card record and a debit card record.

17. A transaction processor interface for processing payment of a transaction, the interface including:

an application interface for providing a user with an option, via an electronic terminal used to carry out the transaction, to select payment for the transaction from a telephone account associated with a subscriber line to which the electronic terminal is connected, and for receiving a user request entered into the electronic terminal to process payment from the telephone account;

a modification module for creating a financial instrument record which includes a telephone number associated with the subscriber line wherein the financial instrument record is selected from a group consisting of a credit card record and a debit card record; and a communication module to route the transaction to financial card gateway if a validation module invalidates the transaction.

18. A transaction processor interface as claimed in claim 17, which includes an automatic number identification (ANI) module to obtain the telephone number of the subscriber line.

19. A transaction processor interface as claimed in claim 17, which includes a communications module for communicating the financial instrument record to a validation module for validating the transaction based on data associated with the unique identifier.

20. A transaction validation module for validating a transaction conducted using an electronic terminal connected via a subscriber line to an electronic network, the module including:

an extraction module for extracting a telephone number of the subscriber line from a financial instrument record associated with the transaction; and a processor module for interrogating at least one line identification database (LIDB) based on the telephone number to obtain validation data associated with the subscriber line and selectively validating the transaction according to the validation data, wherein a validating message is communicated on approval of the transaction if the communication line is validated, and processing of the transaction is routed to a financial card gateway if the communication line is not validated.

21. A transaction validation module as claimed in claim 20, in which charges for the transaction are included in an account associated with the subscriber line.

22. A computer program product including a medium readable by a processor, the medium carrying instructions which, when executed by the processor, cause the processor to:

provide a user, via an electronic terminal used to carry out a transaction, with an option to select payment for the transaction from a telephone account associated with a subscriber line to which the electronic terminal is connected;

receive a user request entered into the electronic terminal to process payment from the telephone account;

investigate data associated with the subscriber line;

selectively approve the transaction dependent upon an outcome of the investigation; and selectively route processing of the transaction to a financial instrument gateway in the event of a validation process not validating the subscriber line.

23. A product as claimed in claim 22, which includes identifying the telephone number of the subscriber line using automatic number identification (ANI) techniques.

24. A product as claimed in claim 22, which includes combining the telephone number and transaction data to form a financial instrument record.

25. A computer program product including a medium readable by a processor, the medium carrying instructions which, when executed by the processor, cause the processor to:

receive a financial instrument record associated with the transaction conducted using an electronic terminal connected via a subscriber line connected to a communication network;

extract a telephone number from the financial instrument record, the telephone number being associated with the communication line;

interrogate at least one database based on the telephone number to obtain validation data associated with the subscriber line and selectively validate the transaction according to the validation data; and selectively route processing of the transaction to a financial instrument gateway in the event of a validation process not validating the subscriber line.

26. A product as claimed in claim 25, in which the processor retrieves information from a line identification database (LIDB).

27. A method as claimed in claim 25, in which charges for the transaction are included in a telephone account associated with the subscriber line.

* * * * *

UNITED STATES PATENT AND TRADEMARK OFFICE
CERTIFICATE OF CORRECTION

PATENT NO. : 7,080,049 B2
APPLICATION NO. : 09/962043
DATED : July 18, 2006
INVENTOR(S) : Truitt et al.

It is certified that error appears in the above-identified patent and that said Letters Patent is hereby corrected as shown below:

On the Title page, item (56), under "Foreign Patent Documents", in column 2, line 1, after "4/1999" insert -- H04N 07/01 --.

On the Title page, item (56), under "Other Publications", in column 2, line 5, delete ""4.1.2," and insert -- "4.1.2. --, therefor.

In columns 9-10, line 30, delete "LTRANS TYPE" and insert -- TRANS TYPE --, therefor.

In column 11, line 8, after "53-55" delete "RESPONSE CDOE" and insert -- RESPONSE CODE --, therefor.

In columns 11-12, line 8, after "78-80" delete "RESPONSE CDOE" and insert -- RESPONSE CODE --, therefor.

In column 17, line 33, delete "104 112" and insert -- 104–112 --, therefor.

In column 22, line 4, delete "requester" and insert -- requestor --, therefor.

In column 31, line 13 (TABLE 2), delete "AMI" and insert -- ANI --, therefor.

In column 32, line 58 (TABLE 2), delete "th" and insert -- the --, therefor.

In column 33, line 6 (TABLE 2), delete "Audiotext Bock" and insert -- Audiotext Block --, therefor.

In column 33, line 11 (TABLE 2), delete "Use DN" and insert -- Use–DN --, therefor.

In columns 35–36, line 43 (TABLE 2), delete "transaction," and insert -- transact-tion. --, therefor.

In column 38, line 19 (TABLE 3), delete "Admn" and insert -- Admin. --, therefor.

In columns 39–40, line 50 (TABLE 3), delete "only" and insert -- only) --, therefor.

In column 47, line 61, delete "AMI" and insert --ANI --, therefor.

In column 52, line 55, delete "Bill Control" and insert -- BILL CONTROL --, therefor.

UNITED STATES PATENT AND TRADEMARK OFFICE
CERTIFICATE OF CORRECTION

PATENT NO. : 7,080,049 B2
APPLICATION NO. : 09/962043
DATED : July 18, 2006
INVENTOR(S) : Truitt et al.

It is certified that error appears in the above-identified patent and that said Letters Patent is hereby corrected as shown below:

In column 55, line 1, delete "Validation Table Maintenance" and insert
-- VALIDATION TABLE MAINTENANCE --, therefor.

In column 57, line 24, delete "Data type" and insert -- Data Type --, therefor.

In column 58, line 12, delete "NSP Product" and insert -- NSP_Product --, therefor.

In column 58, line 17, delete "Rejected" and insert -- Reject --, therefor.

In column 59, line 31, delete "OCN Purge Schdeule" and insert -- OCN PURGE SCHEDULE --, therefor.

In column 64, line 24, delete "fashion the" and insert -- fashion. The --, therefor.

In column 65, line 20, in Claim 4, delete "a credit card record." and insert -- an industry standard credit card record. --, therefor.

In column 66, line 27, in Claim 14, delete "telecommunication" and insert
-- telecommunications --, therefor.

Signed and Sealed this

Nineteenth Day of December, 2006

JON W. DUDAS
*Director of the United States Patent and Trademark Office*